United States Patent
Kusano et al.

(10) Patent No.: US 10,667,196 B2
(45) Date of Patent: May 26, 2020

(54) MOBILE STATION, BASE STATION, MAINTENANCE DEVICE, MOBILE COMMUNICATION SYSTEM AND HANDOVER POSITION DETERMINATION METHOD

(71) Applicant: MITSUBISHI ELECTRIC CORPORATION, Chiyoda-ku, Tokyo (JP)

(72) Inventors: Masaaki Kusano, Tokyo (JP); Tetsuya Aoyama, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 156 days.

(21) Appl. No.: 15/565,863

(22) PCT Filed: Jun. 8, 2015

(86) PCT No.: PCT/JP2015/066528
§ 371 (c)(1),
(2) Date: Oct. 11, 2017

(87) PCT Pub. No.: WO2016/199208
PCT Pub. Date: Dec. 15, 2016

(65) Prior Publication Data
US 2018/0124675 A1    May 3, 2018

(51) Int. Cl.
*H04W 36/32* (2009.01)
*H04W 4/42* (2018.01)
(Continued)

(52) U.S. Cl.
CPC .............. *H04W 36/32* (2013.01); *H04W 4/42* (2018.02); *H04W 24/08* (2013.01); *H04W 36/08* (2013.01); *H04W 88/02* (2013.01)

(58) Field of Classification Search
CPC ......... H04W 4/02; H04W 4/42; H04W 24/08; H04W 36/08; H04W 36/20; H04W 36/32;
(Continued)

(56) References Cited

U.S. PATENT DOCUMENTS

| 2008/0102838 A1* | 5/2008 | Takai | H04W 36/30 |
| | | | 455/438 |
| 2009/0093253 A1* | 4/2009 | Hayashi | H04W 52/40 |
| | | | 455/436 |
| 2017/0318516 A1* | 11/2017 | Huang | H04W 36/0083 |

FOREIGN PATENT DOCUMENTS

| JP | 2007-082075 A | 3/2007 |
| JP | 2008-118229 A | 5/2008 |

(Continued)

OTHER PUBLICATIONS

International Search Report (PCT/ISA/210) dated Aug. 18, 2015, by the Japanese Patent Office as the International Searching Authority for International Application No. PCT/JP2015/066528.
(Continued)

*Primary Examiner* — Khoa Huynh
(74) *Attorney, Agent, or Firm* — Buchanan Ingersoll & Rooney PC

(57) ABSTRACT

A wireless communication unit transmits and receives signals to and from a base station and measures the received quality of downlink signals. A position information acquisition unit acquires position information on a mobile station. A measurement information management unit acquires the position information, received quality information, and received quality information that is measurement result of received quality of uplink signals from the mobile station, and stores measurement information which is received quality information on signals transmitted and received between the mobile station and the base station. A communication connection control unit acquires the position information
(Continued)

from the position information acquisition unit, and performs a handover when a position of the mobile station is a handover position so as to switch base stations to be connected.

13 Claims, 15 Drawing Sheets

(51) Int. Cl.
  *H04W 24/08* (2009.01)
  *H04W 36/08* (2009.01)
  *H04W 88/02* (2009.01)
(58) Field of Classification Search
  CPC . H04W 36/36; H04W 88/02; H04W 36/0083; H04W 36/30; H04W 52/40
  See application file for complete search history.

(56) References Cited

FOREIGN PATENT DOCUMENTS

| | | |
|---|---|---|
| JP | 2009-094612 A | 4/2009 |
| JP | 2014-110578 A | 6/2014 |
| WO | WO 2009/011065 A1 | 1/2009 |

OTHER PUBLICATIONS

Written Opinion (PCT/ISA/237) dated Aug. 18, 2015, by the Japanese Patent Office as the International Searching Authority for International Application No. PCT/JP2015/066528.

\* cited by examiner

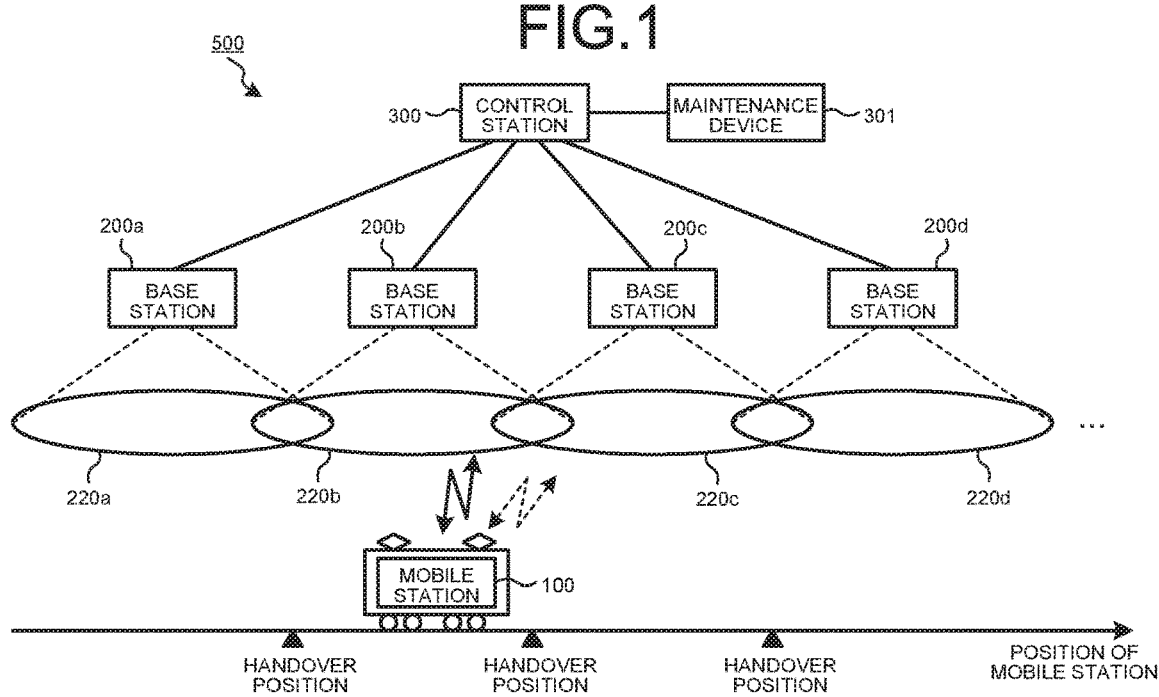
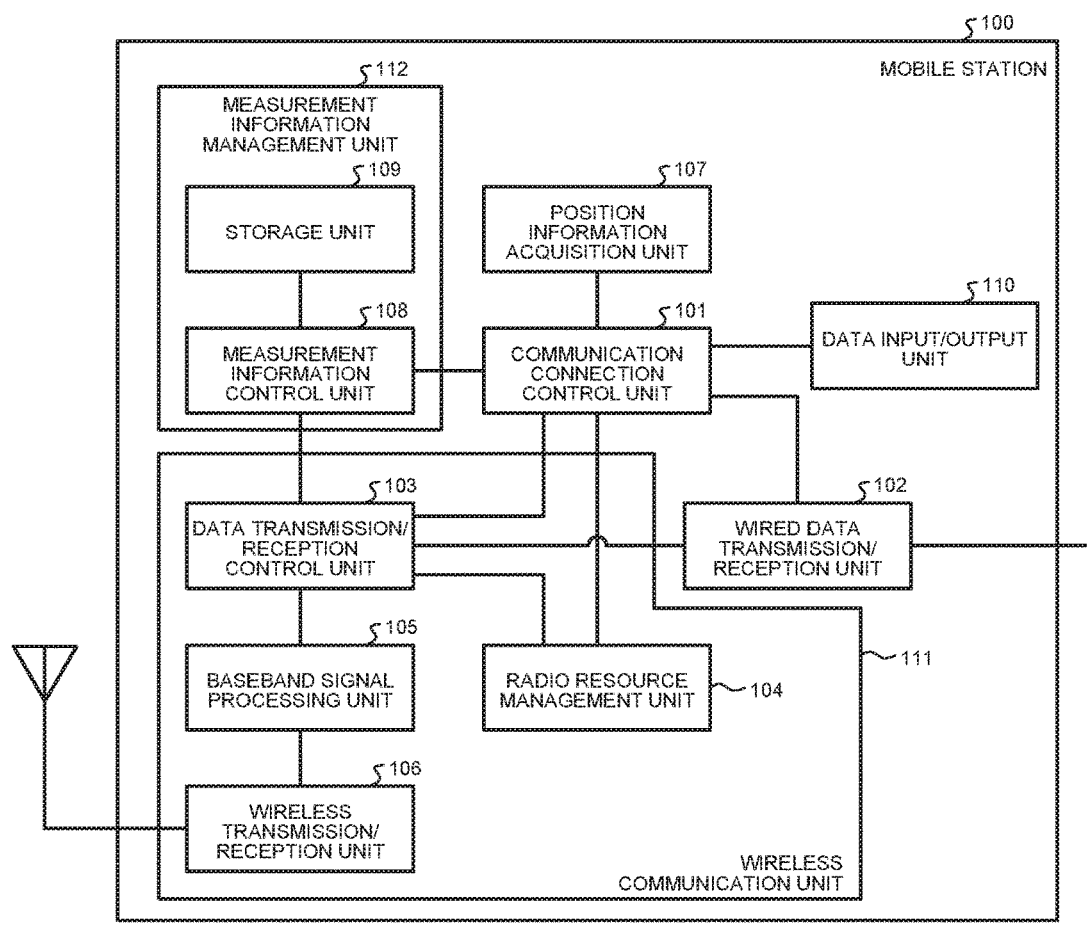

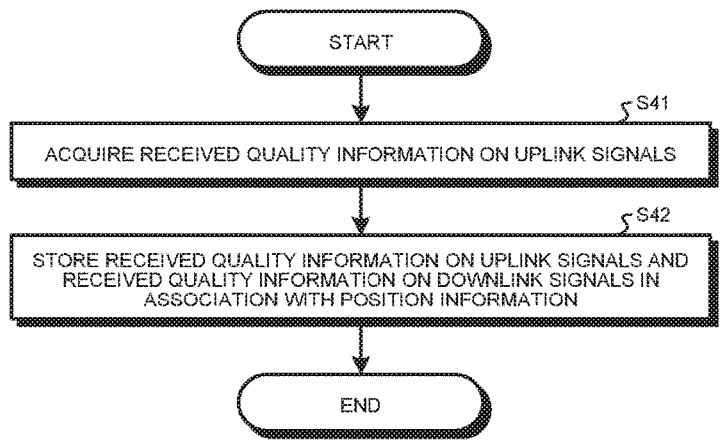

MOBILE STATION, BASE STATION, MAINTENANCE DEVICE, MOBILE COMMUNICATION SYSTEM AND HANDOVER POSITION DETERMINATION METHOD

FIELD

The present invention relates to a mobile station, a base station, a maintenance device, a mobile communication system, and a handover position determination method in a mobile communication system in which a mobile station executes a handover to switch base stations to be connected to perform wireless communication.

BACKGROUND

Conventionally, there is a cellular mobile communication system applied to a traffic system in which a mobile station is a train, an automobile running on a highway, or the like. Since tracks of trains or traveling paths of automobiles are known in such a mobile communication system, it is possible to determine a base station capable of communicating with the mobile station on the basis of a position of the mobile station obtained by a positioning system or a travel distance from a reference position. That is, the mobile station can perform a handover depending on the position of the mobile station. In a case where the position of the handover by the mobile station is already determined, a handover procedure between the mobile station and the base station is simplified, so that the handover can be performed in a short time. Patent Literature 1 discloses a technique with which a mobile station switches connection destinations from a current base station to another base station when distance to the other base station becomes equal to or less than a preset threshold.

CITATION LIST

Patent Literature

Patent Literature 1: Japanese Patent Application Laid-Open No. 2007-82075

SUMMARY

Technical Problem

When a mobile station performs a handover, in order to ensure communication quality before and after the handover, it is necessary to achieve communication quality higher than a certain level for communication quality between the mobile station and a base station as a handover source before the handover, and communication quality between the mobile station and a base station as a handover destination after the handover. When the mobile station performs a handover based on a position of the mobile station, the setting of a handover position where the mobile station performs the handover becomes of importance.

However, according to the above conventional technique, there is no specific description or suggestion as to how to set a distance for switching base stations as a connection destination. In addition, a change in a surrounding radio wave condition can cause another change in communication quality between a mobile station and a base station in a mobile communication system. Therefore, even if the mobile station switches the base stations to be connected at a set distance, the communication quality expected at the time of setting cannot be obtained, which is problematic.

The present invention has been made in view of the above, and it is an object of the present invention to obtain a mobile station capable of performing a handover at a handover position determined or changed on the basis of received quality of signals transmitted and received between the mobile station and a base station.

Solution to Problem

In order to solve the above-mentioned problem and to achieve the object, a mobile station of the present invention includes a wireless communication unit which transmits and receives signals to and from a base station and measures received quality of downlink signals received from the base station. The mobile station includes a position information acquisition unit which acquires position information on the mobile station. The mobile station includes a measurement information management unit which acquires the position information, received quality information that is measurement result of received quality of downlink signals received from a handover source base station currently connected and a handover destination base station to be connected next measured in the wireless communication unit, and received quality information that is measurement result of received quality of uplink signals from the mobile station measured in the handover destination base station and the handover source base station acquired from the handover source base station, and stores measurement information as received quality information on signals transmitted and received between the mobile station and the base station. The mobile station includes a communication connection control unit which acquires the position information from the position information acquisition unit, and performs a handover when a position of the mobile station is a handover position determined on the basis of the measurement information to switch base stations to be connected.

Advantageous Effects of Invention

The mobile station according to the present invention has an effect such that a handover can be performed at a handover position determined or changed based on the received quality of signals transmitted and received between the mobile station and the base station.

BRIEF DESCRIPTION OF DRAWINGS

FIG. 1 is a diagram illustrating a configuration example of a mobile communication system.

FIG. 2 is a block diagram illustrating a configuration example of a mobile station.

FIG. 14 is a diagram illustrating an example of measurement information which a measurement information control unit causes a storage unit to store.

FIG. 15 is a flow chart illustrating a measurement information storage process of the mobile station.

DESCRIPTION OF EMBODIMENTS

Figure 3:
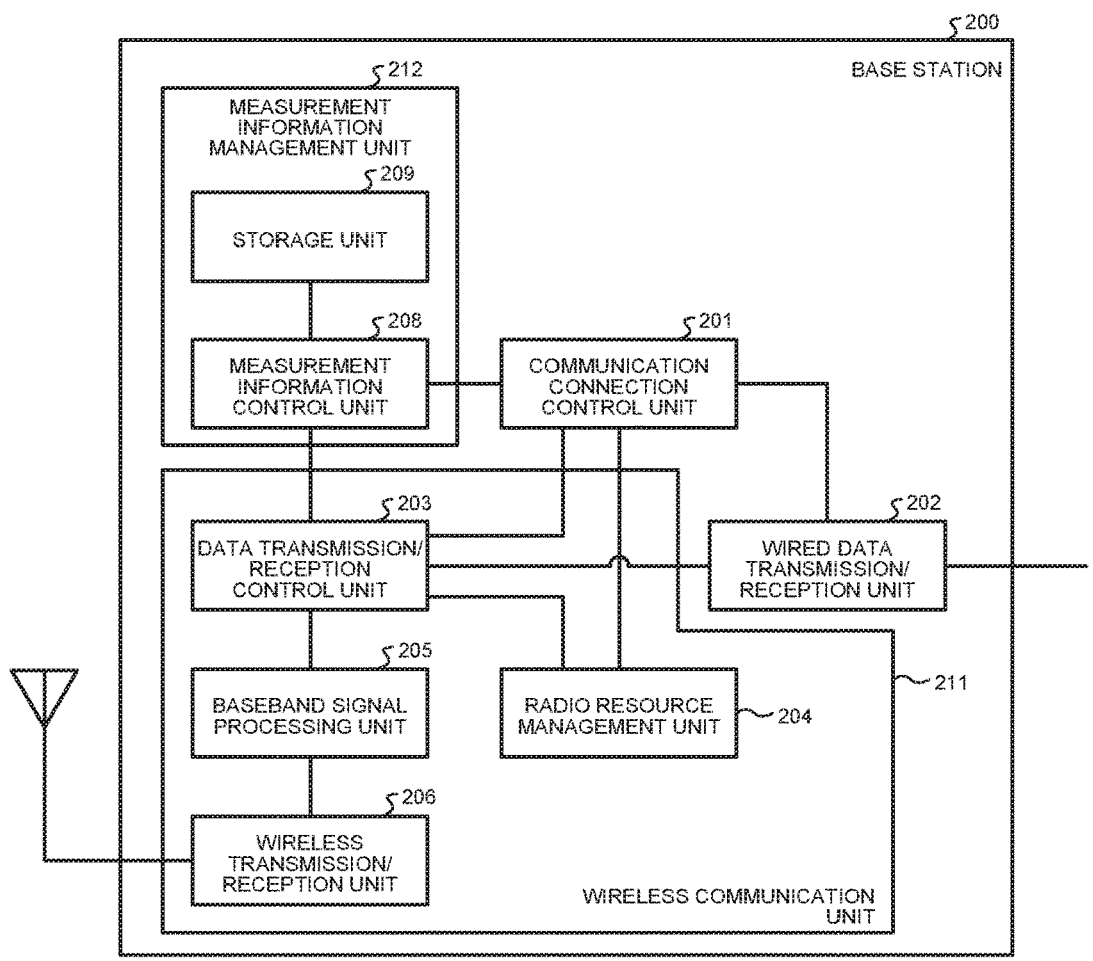
FIG. 3 is a block diagram illustrating a configuration example of a base station.

Hereinafter, a mobile station, a base station, a maintenance device, a mobile communication system, and a handover position determination method according to an embodiment of the present invention will be described in detail with reference to the drawings. The invention is not limited to the embodiment.

EMBODIMENT

FIG. 1 is a diagram illustrating a configuration example of a mobile communication system 500 according to an embodiment of the present invention. The mobile communication system 500 includes a mobile station 100 mounted on a train; base stations 200a, 200b, 200c, and 200d, which communicate with the mobile station 100; a control station 300, which manages information about the base stations 200a to 200d; and a maintenance device 301, which monitors the state of each device in the mobile communication system 500. The mobile communication system 500 is a system in which the mobile station 100 mounted on the train performs communication while moving as the train runs through the communication areas 220a to 220d, which are formed by the base stations 200a to 200d, respectively.

In FIG. 1, there is only one train that has the mobile station 100 mounted thereon, but this is merely an example. In the mobile communication system 500, it is possible to communicate with a plurality of trains, each having a mobile station 100 mounted thereon. In the following description, the base stations 200a to 200d can be referred to as a base station 200 when no distinction is made among them, and the communication areas 220a to 220d can be referred to as a communication area 220 when no distinction is made among them.

FIG. 2 is a block diagram illustrating a configuration example of the mobile station 100 according to the present embodiment. The mobile station 100 includes a communication connection control unit 101; a wired data transmission/reception unit 102; a data transmission/reception control unit 103; a radio resource management unit 104; a baseband signal processing unit 105; a wireless transmission/reception unit 106; a position information acquisition unit 107; a measurement information control unit 108; a storage unit 109; and a data input/output unit 110. The data transmission/reception control unit 103, the radio resource management unit 104, the baseband signal processing unit 105, and the wireless transmission/reception unit 106 constitute a wireless communication unit 111, and the measurement information control unit 108 and the storage unit 109 constitute a measurement information management unit 112.

Regarding the communication between the mobile station 100 and the base station 200, the communication connection control unit 101 controls, for example, synchronization with the base station 200 as well as the addition and deletion of connections established at the time of communication. The communication connection n control unit 101 acquires information on a handover position from the maintenance device 301; performs a handover at a handover position determined or changed by the maintenance device 301; and performs control so as to switch the base stations 200 that is the connection destination. The communication connection control unit 101 further performs control so as to switch operation modes to measure the received quality of signals transmitted to and received from the base station 200. The operation mode of the mobile station 100 includes an operation mode 1, which is a test running mode in which, when first determining a handover position, the received quality of received signals is measured a plurality of times by the mobile station 100, by the base station 200 that is the base station being handed over from and to which the mobile station 100 is currently connected (hereinafter referred to as a handover source base station 200), and by the base station 200 that is the base station being handed over to and to which the mobile station 100 will be connected next (hereinafter referred to as a handover destination base station 200). The operation mode of the mobile station 100 further includes an operation mode 2, which is a normal running mode in which the mobile station 100, the handover source base station 200, and the handover destination base station 200 measure the received quality of received signals in the current handover position when changing the determined handover position. For example, when the operation mode 1 or the operation mode 2 is selected by an operation of a train operator, a measurer, or the like, the communication connection control unit 101 activates a program corresponding to the selected operation mode and reads set values of various parameters for each operation mode, thereby controlling the operation of the mobile station 100 in the selected operation mode. The communication connection control unit 101 can internally store the program of each operation mode and the set values of various parameters or it can read them from an external memory.

The communication connection control unit 101 acquires the position information on the mobile station from the position information acquisition unit 107, and when the position of the mobile station is the handover position determined on the basis of the measurement information in the maintenance device 301, the communication connection control unit 101 performs the handover to switch the base station 200 to which the mobile station is to be connected.

The wired data transmission/reception unit 102 transmits and receives control information and data to and from an external device of a train-board network.

The data transmission/reception control unit 103 transmits and receives data to and from the base station 200 by using a radio resource managed by the radio resource management unit 104. The data transmission/reception control unit 103 captures information addressed to the mobile station received from the base station 200, and it outputs the captured information to the communication connection control unit 101. In addition, the data transmission/reception control unit 103 performs a general media access control (MAC) protocol process for performing communication with the base station 200 as well as a format conversion process on wireless signals such as framing or deframing.

The radio resource management unit 104 manages information on the radio resources used when the base station 200 and the mobile station 100 transmit and receive data.

The baseband signal processing unit 105 performs a modulation process on a wireless signal to be transmitted, a demodulation process on a received wireless signal, and the like. In addition, the baseband signal processing unit 105 measures the received quality of downlink signals received from the base station 200. In the baseband signal processing unit 105, for example, a signal to noise ratio (SN ratio) is measured, which is a signal-to-noise ratio when a downlink signal transmitted from the base station 200 is received, but there is no limitation thereto. The baseband signal processing unit 105 can measure the received quality of a downlink signal when instructed by the communication connection control unit 101 or it can measure received quality of all downlink signals that have been received.

The wireless transmission/reception unit 106 transmits and receives wireless signals via an antenna The position information acquisition unit 107 sequentially acquires positions of the mobile station. The position information acquisition unit 107 determines whether the mobile station 100 has reached the handover position or whether the mobile station 100 has reached a position for periodically transmitting a measurement result request in the operation mode 1, and then it instructs the communication connection control unit 101 to perform a handover or measurement in the operation mode 1. Alternatively, the communication connection control unit 101 can read the position of the mobile station 100 from the position information acquisition unit 107, and the position information acquisition unit 107 can provide, to the communication connection control unit 101, the handover position or position information in a case where the measurement result request is periodically transmitted in the operation mode 1. For example, the position information acquisition unit 107 can obtain the position of the mobile station by itself, i.e., obtain the position of the mobile station 100 that includes the position information acquisition unit 107, by receiving radio waves from a plurality of global positioning system (GPS) satellites, or it can acquire position information on the mobile station from an external device. The method for obtaining the position or the mobile station by using the GPS satellites in the position information acquisition unit 107 is merely an example, and there is no limitation thereto. In the system in which the mobile station 100 mounted on the train performs communication as in this embodiment, the position information acquisition unit 107 can obtain the position of the mobile station by using the distance the train has travelled from a reference or the like.

The measurement information control unit 108 acquires received quality information on the received quality of the downlink signals measured in the baseband signal processing unit 105 via the data transmission/reception control unit 103 and causes the storage unit 109 to store the received quality information together with the position information on the mobile station acquired from the position information acquisition unit 107 via the communication connection control unit 101 and to store information on the moving direction of the train, which information from the control station 300 acquired via the communication connection control unit 101 Regarding received quality information on uplink signals measured at the base station 200 and included in the message received from the base station 200, the measurement information control unit 108 causes the storage unit 109 to store received quality information together with the above-described position information and received quality information on the downlink signals after confirming there is a correspondence with a sequence number of a measurement result request 1 to be described later, the measurement result request 1 being transmitted from the mobile station on the basis of message type and the sequence number of the message received by the communication connection control unit 101 from the base station 200.

The storage unit 109 stores the moving direction of the train; position information on the mobile station 100 received quality information on the downlink signals measured at the baseband signal processing unit 105; and the received quality information on the uplink signals measured at the base station 200. As described later, the storage unit 109 can also store time information on the time of measuring the received quality of the downlink signals in the baseband signal processing unit 105 together with the above-described information. The information stored in the storage unit 109 is referred to as measurement information.

When providing the measurement information stored in the storage unit 109 to the maintenance device 301 off-line, the data input/output unit 110 acquires the measurement information stored in the storage unit 109 via the communication connection control unit 101 and the measurement information control unit 108, and it outputs the acquired measurement information to a storage medium. In addition, when acquiring information on the handover position determined or changed by the maintenance device 301 off-line, the data input/output unit 110 reads, in the maintenance device 301, information on the handover position from the storage medium in which the information on the handover position has been written, and it outputs the read information on the handover position to the communication connection control unit 101.

When the measurement information stored in the storage unit 109 is output to the maintenance device 301, in the mobile station 100, the measurement information control unit 108 reads the measurement information stored in the storage unit 109 and outputs the measurement information to the communication connection control unit 101, and then the communication connection control unit 101 generates a message including the measurement information. Thereafter, the communication connection control unit 101 transmits the message on-line to the maintenance device 301, which determines the handover position on the basis of the measurement information. This transmission is via the data transmission/reception control unit 103 or the like, i.e., via the wireless communication unit 111. Alternatively, as described above, the measurement information control unit 108 reads the measurement information stored in the storage unit 109 and outputs the measurement information to the communication connection control unit 101, and the communication connection control unit 101 can output the measurement information from the data input/output unit 110 to the storage medium. When using the data input/output unit 110, information is exchanged off-line between the mobile station 100 and the maintenance device 301 via the storage medium.

In the mobile station 100, the wired data transmission/reception unit 102 is constituted by a transmitter and a receiver for wired communication. The wireless communication unit 111 constituted by the data transmission/reception control unit 103, the radio resource management unit 104, the baseband signal processing unit 105; and the wireless transmission/reception unit 106 is constituted by a transmitter and a receiver for wireless communication. The data input/output unit 110 is constituted by an input interface circuit, which receives input of data from an external source, such as reading from a recording medium, and an output interface circuit, which performs output of data to an external destination, such as writing to a recording medium. The storage unit 109 is constituted by a memory.

In the mobile station 100, the wireless communication unit 111 transmits and receives data to and from the base station 200, and it measures the received quality of the downlink signals received from the base station 200. The measurement information management unit 112 acquires position information; received quality information that is measurement result of the received quality of the downlink signals received from the handover source base station and the handover destination base station measured in the wireless communication unit 111; and received quality information that is measurement result of the received quality of the uplink signals from the mobile station measured in the handover destination base station and the handover source base station acquired from the handover source base station. The measurement information management unit 112 then stores the measurement information as received quality information on signals transmitted and received between the mobile station 100 and the base station 200.

FIG. 3 is a block diagram illustrating a configuration example of the base station 200 according to the present embodiment. The base stations 200*a* to 200*d* have the same configuration. The base station 200 includes a communication connection control unit 201; a wired data transmission/reception unit 202; a data transmission/reception control unit 203; a radio resource management unit 204; a baseband signal processing unit 205; a wireless transmission/reception unit 206; a measurement information control unit 208; and a storage unit 209. The data transmission/reception control unit 203, the radio resource management unit 204, the baseband signal processing unit 205, and the wireless transmission/reception unit 206 constitute a wireless communication unit 211; and the measurement information control unit 208 and the storage unit 209 constitute a measurement information management unit 212.

In the communication between the base station 200 and the mobile station 100, the communication connection control unit 201 controls, for example, synchronization with the mobile station 100 and the addition and deletion of connections established at the time of communication. The communication connection control unit 201 performs an operation according to the message type of a message included in each uplink signal received from the mobile station 100. The communication connection control unit 201 controls the transfer of the received quality information on the uplink signals to another base station 200 or the mobile station 100.

The wired data transmission/reception unit 202 transmits and receives control information and data to and from the control station 300 via a wired network.

The data transmission/reception control unit 203 transmits and receives data to and from the mobile station 100 by using a radio resource managed by the radio resource management unit 204. The data transmission/reception control unit 203 captures information addressed to the base station and received from the mobile station 100, and it outputs the captured information to the communication connection control unit 201. In addition, the data transmission/reception control unit 203 performs a general MAC protocol process for performing communication with the mobile station 100 as well as performing a format conversion process on wireless signals such as framing or deframing.

The radio resource management unit 204 manages information on radio resources used when the base station 200 and the mobile station 100 transmit and receive data. In addition, the radio resource management unit 204 allocates, to the mobile station 100, a radio resource to be used for transmitting uplink signals.

The baseband signal processing unit 205 performs a modulation process on a wireless signal to be transmitted, a demodulation process on a received wireless signal, and the like. The baseband signal processing unit 205 measures received quality of uplink signals received from the mobile station 100. In the baseband signal processing unit 205, for example, an SN ratio is measured, which is the signal-to-noise ratio when an uplink signal transmitted from the mobile station 100 is received, but there is no limitation thereto. It is assumed that the baseband signal processing unit 205 measures the received quality of all uplink signals received from the mobile station 100.

The wireless transmission/reception unit 206 transmits and receives wireless signals via an antenna.

The measurement information control unit 208 acquires, from the baseband signal processing unit 205 via the data transmission/reception control unit 203, the received quality information on the received quality of the uplink signals measured in the baseband signal processing unit 205 and time information on the time of measuring the received quality of the uplink signals in the baseband signal processing unit 205, and it causes the storage unit 209 to store the acquired information.

The storage unit 209 stores the received quality information on the uplink signals measured in the baseband signal processing unit 205 and the time information on the time of measuring the received quality of the uplink signals.

When the information stored in the storage unit 209 is transmitted to another device, in the base station 200, the measurement information control unit 208 reads the received quality information on the uplink signals or both the received quality information on the uplink signals and the time information stored in the storage unit 209, and then it outputs the information to the communication connection control unit 201; and the communication connection control unit 201 converts the information acquired from the measurement information control unit 208 into a message format and then transmits the information via the wired data transmission/reception unit 202 or the data transmission/reception control unit 203.

In the base station 200, the wired data transmission/reception unit 202 is constituted by a transmitter and a receiver for wired communication. The wireless communication unit 211 constituted by the data transmission/reception control unit 203, the radio resource management unit 204, the baseband signal processing unit 205, and the wireless transmission/reception unit 206 is constituted by a transmitter and a receiver for wireless communication. The storage unit 209 is constituted by a memory.

In the base station 200, the wireless communication unit 211 transmits and receives signals to and from the mobile station 100 and measures the received quality of the uplink signals received from the mobile station 100. The measurement information management unit 212 acquires and stores the received quality information on the uplink signals measured in the wireless communication unit 211 and the time information on the time of measuring the received quality of the uplink signals.

The control station 300 manages information on the base station 200 to which the mobile station 100 is to be connected, and it performs data communication with the mobile station 100 via the base station 200. In addition, the control station 300 provides the mobile station 100 with information on the base station 200 to be connected next during a handover. Alternatively, the control station 300 provides the base station 200 with information on an adjacent base station 200, and the base station 200 can broadcast, to the mobile station 100 located in the communication area 220, the information on the adjacent base station 200. Because the configuration of the control station 300 is similar to that of a conventional one, a detailed description of the configuration will be omitted.

Figure 4:
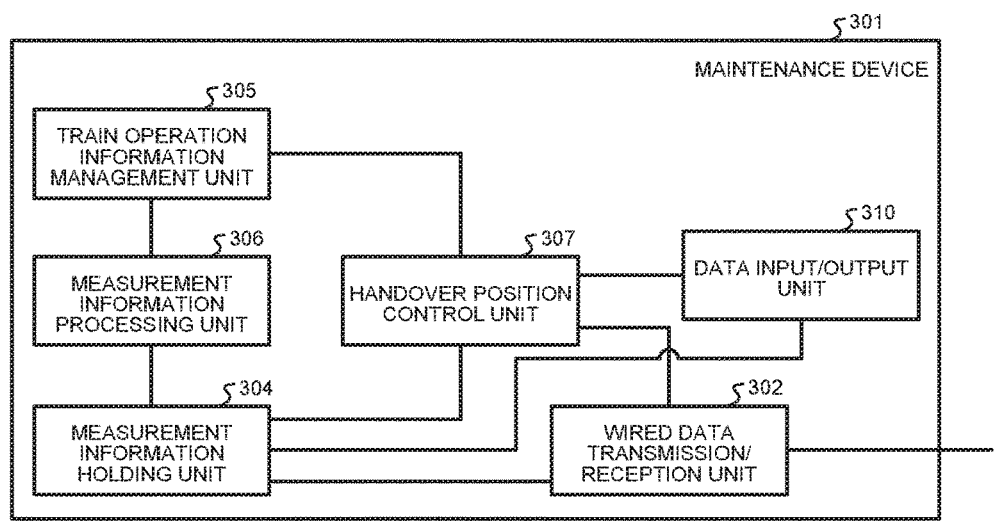
FIG. 4 is a block diagram illustrating a configuration example of a maintenance device.

FIG. 4 is a block diagram illustrating a configuration example of the maintenance device 301 according to the present embodiment. The maintenance device 301 includes a wired data transmission/reception unit 302, a measurement information holding unit 304, a train operation information management unit 305, a measurement information processing unit 306, a handover position control unit 307, and a data input/output unit 310.

The wired data transmission/reception unit 302 transmits and receives control information and data to and from the control station 300 via a network.

The measurement information holding unit 304 holds measurement information including the received quality information on the signals measured in the mobile station 100 and the base station 200 acquired from the mobile station 100 via the wired data transmission/reception unit 302 or the data input/output unit 310.

The train operation information management unit 305 provides operation information on the train including the mobile station 100 mounted thereon. In addition, the train operation information management unit 305 provides the handover position control unit 307 with information regarding that which mobile station 100 the information on the handover position determined or changed is distributed to.

Based on the operation information on the train including the mobile station 100 mounted thereon, the measurement information processing unit 306 performs control such that the handover position control unit 307 does not use a piece of measurement information affected by an operation of another train in the measurement of the received quality, among pieces of the measurement information held in the measurement information holding unit 304, when determining the handover position. The measurement information affected by the operation of another train in the measurement of the received quality is, for example, measurement information including received quality information on a downlink signal measured in a case where, at a time point when the mobile station 100 measured received quality of a downlink signal at a certain point, the other train was traveling in an opposite direction on an adjacent track and the trains passed each other. For example, the measurement information processing unit 306 performs a process such as setting a flag on an unusable piece among pieces of the measurement information on the received quality information held in the measurement information holding unit 304, thereby making it possible to identify pieces of the measurement information unusable by the handover position control unit 307.

The handover position control unit 307 determines the handover position of the mobile station 100 on the basis of the measurement information held in the measurement information holding unit 304 and distributes the handover position to the mobile station 100. Detailed operations for determining or changing the handover position of the mobile station 100 by the handover position control unit 307 will be described later.

The data input/output unit 310 reads the measurement information stored in the storage medium by the mobile station 100, and causes the measurement information holding unit 304 to store the measurement information. In addition, the data input/output unit 310 reads information on the handover position determined or changed by the handover position control unit 307 from the handover position control unit 307 and outputs the information to the storage medium. When using the data input/output unit 310, information is exchanged off-line between the mobile station 100 and the maintenance device 301 via the storage medium.

In the maintenance device 301, the wired data transmission/reception unit 302 is constituted by a transmitter and a receiver for wired communication. The measurement information holding unit 304 is constituted by a memory. The data input/output unit 310 is constituted by an input interface circuit which receives input of data from the outside, such as reading from a recording medium, and an output interface circuit which performs output of data to the outside, such as writing to the recording medium.

Thus, in the mobile communication system 500, the maintenance device 301 monitors the state of each device in the mobile communication system 500 and also unifies management of the measurement information including the received quality information on the signals measured by the base station 200 and the mobile station 100, and determines the handover position of the mobile station 100. The mobile station 100 sequentially acquires, by the position information acquisition unit 107, the position information on the mobile station 100 which changes as the train runs, determines whether the mobile station 100 has reached the handover position, and executes the handover at timing when the mobile station 100 reaches the handover position. The detection of the position information on the mobile station 100 and the determination as to whether the mobile station 100 has reached the handover position can be performed by an external device of the mobile station 100 and the external device can instruct the mobile station 100 to perform the handover at the timing when the mobile station 100 reaches the handover position.

Subsequently, operations in the mobile communication system 500 will be described. These are operations by the mobile station 100 of measuring the received quality of the downlink signals from the base station 200, by the base station 200 of measuring the received quality of the uplink signals from the mobile station 100, and by the maintenance device 301 of determining and changing the handover position of the mobile station 100 by using the received quality information on the signals measured by the mobile station 100 and the base station 200.

Figure 5:
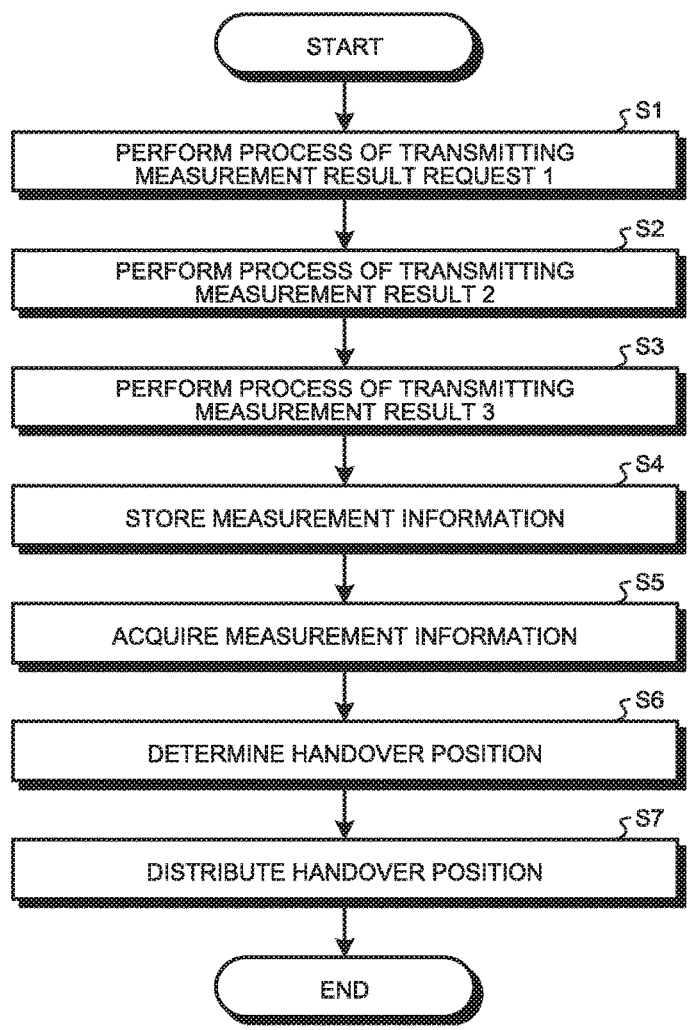
FIG. 5 is a flowchart illustrating operations of the mobile station, the base station, and the maintenance device in determining a handover position in the mobile communication system.

FIG. 5 is a flowchart illustrating operations of the mobile station 100, the base station 200, and the maintenance device 301 in determining a handover position in the mobile communication system 500 according to the present embodiment.

Figure 6:
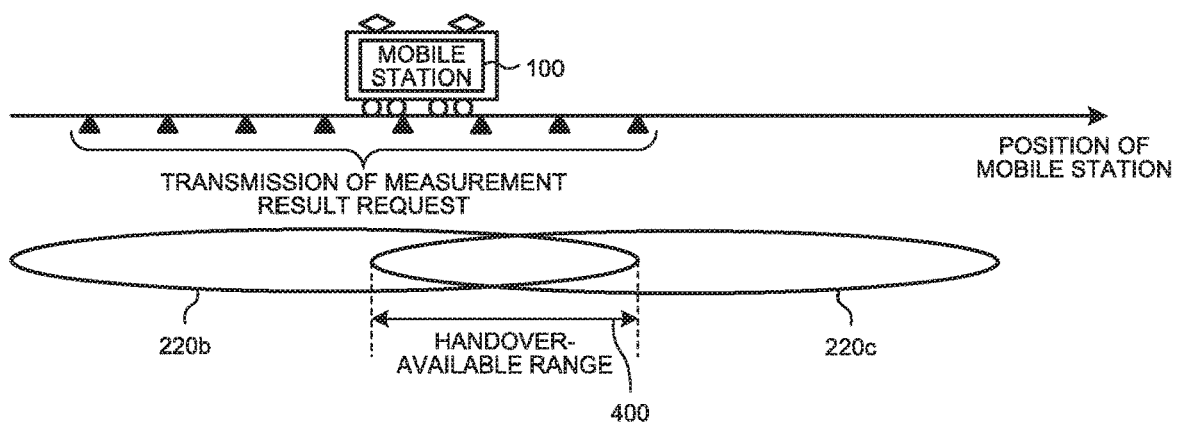
FIG. 6 is a diagram illustrating how the mobile station measures a handover-available range in order to determine an initial value of the handover position.

First, a method for determining an initial value of the handover position will be described. FIG. 6 is a diagram illustrating how the mobile station 100 measures a handover-available range 400, which is a range in which a handover is available, in order to determine the initial value of the handover position in the present embodiment. Specifically, a case will be described where the mobile station 100 moves from the communication area 220b toward the communication area 220c and performs a handover from the base station 200b to the base station 200c. A similar operation is performed when performing a handover at another position, for example, when the mobile station 100 moves from the communication area 220c toward the communication area 220d and performs a handover from the base station 200c to the base station 200d. Here, the base station 200b is the handover source base station to which the mobile station 100 is currently connected, and the base station 200c is the handover destination base station to which the mobile station 100 is connected next. Hereinafter, in the case illustrated in FIG. 6, the base station 200b is referred to as a handover source base station 200b, and the base station 200c is referred to as a handover destination base station 200c.

As described above, the mobile station 100 is configured to be operable by switching the two operation modes of the operation mode 1 during the test running of the train and the operation mode 2 during the normal running thereof. FIG. 6 illustrates a case where the mobile station 100 is operating in the operation mode 1. Under the control of the communication connection control unit 101, while the mobile station 100 is in the communication area 220b, the mobile station 100 continues communication with the handover source base station 200b constituting the communication area 220b, and periodically transmits the measurement result request 1 to be described later over a plurality of times to the handover destination base station 200c constituting the adjacent communication area 220c, thereby measuring the handover-available range. The mobile station 100 thus performs a process on transmitting the measurement result request 1 to the handover destination base station 200c (Step S1). Black triangle marks illustrated in FIG. 6 indicate positions where the mobile station 100 transmits the measurement result request 1. In a case where the mobile station 100 transits the measurement result request 1 a plurality of times in the operation mode 1, the periodic transmission is merely an example, and a periodic transmission can be performed.

Figure 7:
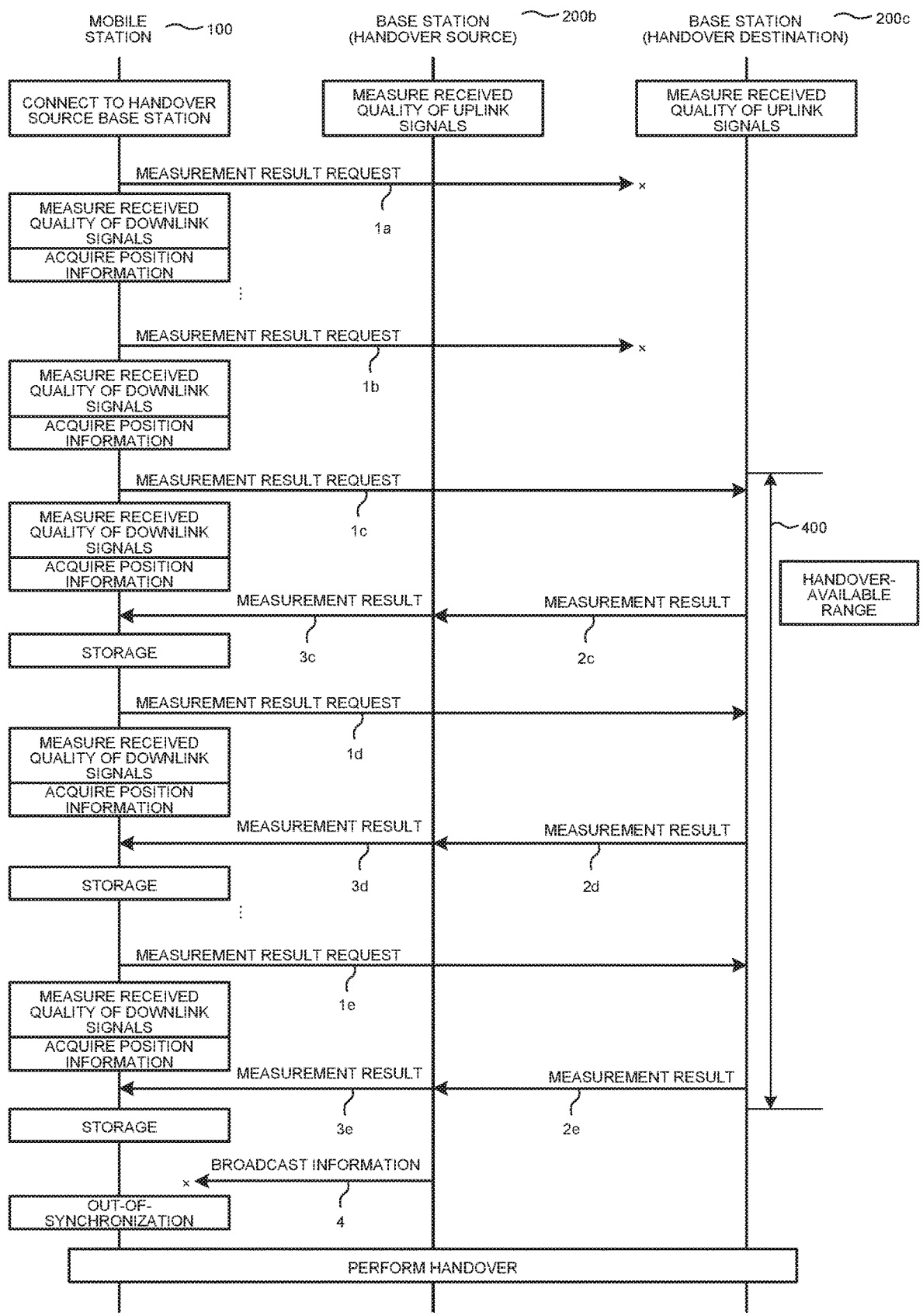
FIG. 7 is a sequence diagram illustrating operations of the mobile station, a handover source base station, and a handover destination base station when measuring the handover-available range.

FIG. 7 is a sequence diagram illustrating operations of the mobile station 100, the handover source base station 200b, and the handover destination base station 200c when measuring the handover-available range 400 in the present embodiment. The mobile station 100 temporarily switches to a communication channel with the handover destination base station 200c while being connected to and communicating with the handover source base station 200b, and periodically transmits, to the handover destination base station 200c, measurement result requests 1a to 1e over a plurality of times. The measurement result requests 1a to 1e are messages which request the handover destination base station 200c, when capable of receiving the measurement result requests 1a to 1e, to transmit received quality information that is measurement result obtained by measuring received quality of the measurement result requests 1a to 1e, to the mobile station 100 via the handover source base station 200b. In the following description, the measurement result requests 1a to 1e can be referred to as a measurement result request 1 when no distinction is made among them.

It is assumed that information on a radio resource for the mobile station 100 to transmit the measurement result request 1 in the communication area 220c, that is, information on a slot position in a radio frame with which the measurement result request 1 can be transmitted, or the like, is reserved before the mobile station 100 moves to the communication area 220c, and is notified from the control station 300 to the mobile station 100 via the base station 200b. Alternatively, when the radio resource in the communication area 220c is not reserved, the mobile station 100 transmits the measurement result request 1 by using a random access channel shared with a plurality of mobile stations 100.

In the mobile station 100, the communication connection control unit 101 generates the measurement result request 1, and under the control of the communication connection control unit 101, the measurement result request 1 is transmitted by using the information on the radio resource managed by the radio resource management unit 104 or the random access channel to the handover destination base station 200c via the data transmission/reception control unit 103, the baseband signal processing unit 105, and the wireless transmission/reception unit 106.

Figure 8:
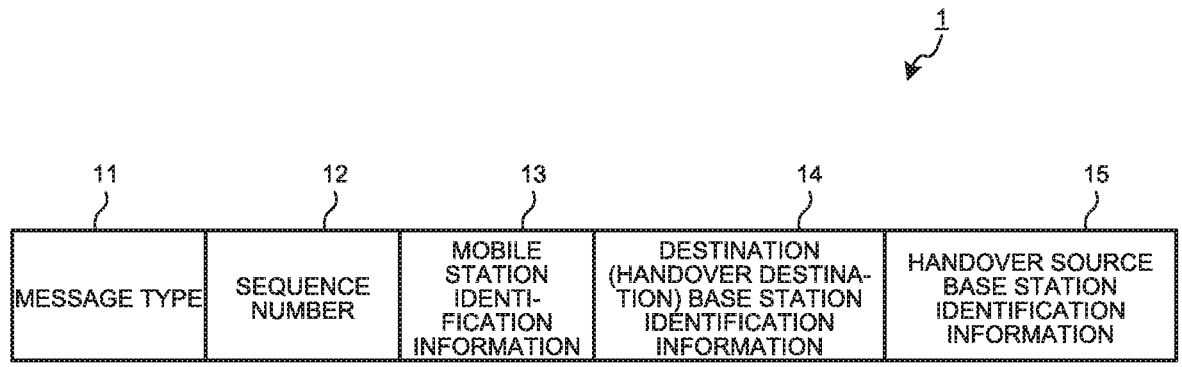
FIG. 8 is a diagram illustrating a configuration example of message information on a measurement result request transmitted by the mobile station.

FIG. 8 is a diagram illustrating a configuration example of message information on the measurement result request 1 transmitted by the mobile station 100 according to the present embodiment. The measurement result request 1 includes message information on a message type 11, a sequence number 12, mobile station identification information 13, destination base station identification information 14, and handover source base station identification information 15.

The message type 11 is information indicating that this is a message of a measurement result request. Upon receiving the measurement result request 1, the handover destination base station 200c transmits received quality information at the time of receiving the measurement result request 1 to the mobile station 100 via the handover source base station 200b.

The sequence number 12 is a number which is incremented each time the mobile station 100 transmits the measurement result request 1. The sequence number 12 is used for establishing correspondence between the measurement result request 1 and a measurement result 3, which is a response from the handover source base station 200b to the measurement result request 1, in the mobile station 100. For example, in FIG. 7, the same number is given to the sequence number 12 of the measurement result request 1c and the sequence number 32 of a measurement result 3c to be described later.

The mobile station identification information 13 is information for identifying the mobile station 100 which has transmitted the measurement result request 1. The mobile station identification information 13 can be, for example, address information on the mobile station 100 which has transmitted the measurement result request 1, but not limited thereto.

The destination base station identification information 14 is information for identifying the handover destination base station 200c to process the measurement result request 1. The destination base station identification information 14 can be, for example, address information on the handover destination base station 200c, but not limited thereto.

The handover source base station identification information 15 is information indicating that via which base station 200 transmission is performed when transmitting the received quality information as the measurement result of the received quality of the measurement result request 1 to the mobile station 100 in the example in FIG. 7, when the destination base station identification information 14 indicates the handover destination base station 200c, the handover source base station identification information 15 indicates the handover source base station 200b. The handover source base station identification information 15 can be, for example, address information on the handover source base station 200b, but not limited thereto.

Referring back to FIG. 7, in the mobile station 100, each time the baseband signal processing unit 105 transmits the measurement result request 1, the received quality of each of the downlink signals received from the handover source base station 200b and the handover destination base station 200c is measured. For example, the baseband signal processing unit 105 receives broadcast information 4 transmitted from the handover source base station 200b and the handover destination base station 200c, and measures the received quality of the downlink signals by measuring the SN ratio as described above. When measuring the received quality of the broadcast information 4 transmitted from the handover source base station 200b and the handover destination base station 200c, the baseband signal processing unit 105 can perform the measurement not for each transmission of the measurement result request 1 but for each reception of the broadcast information. It is sufficient that the timing of transmitting the measurement result request 1 and the measurement result obtained when measuring the received quality of the downlink signal at the timing of transmitting the measurement result request 1 can be associated with each other in the mobile station 100. When measuring the received quality of the downlink signals of the handover destination base station 200c, the mobile station 100 temporarily switches to the communication channel with the handover destination base station 200c under the control of the communication connection control unit 101, and the baseband signal processing unit 105 measures the received quality of the broadcast information 4 transmitted from the handover destination base station 200c.

In the mobile station 100, when the measurement result request 1 is transmitted, the communication connection control unit 101 acquires the position information on the mobile station 100 via the position information acquisition unit 107, and waits for reception of the measurement result 3 which is a response to the measurement result request 1. In the sequence diagram illustrated in FIG. 7, it is illustrated that the response to the measurement result request 1c is the measurement result 3c, for example. The example in FIG. 7 illustrates that since the transmission of the measurement result requests 1a and 1b from the mobile station 100 was performed outside the communication area 220c of the handover destination base station 200c, the handover destination base station 200c could not receive the measurement result requests 1a and 1b. Thereafter, when the train including the mobile station 100 mounted thereon moves and the mobile station 100 enters the communication area 220c of the handover destination base station 200c, the handover destination base station 200c can receive the measurement result request 1c.

Figure 9:
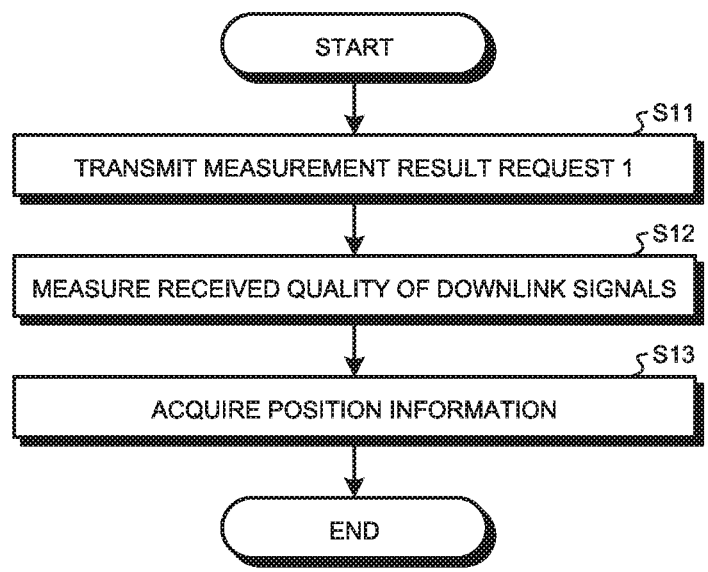
FIG. 9 is a flowchart illustrating an operation of a measurement result request transmission process of the mobile station.

The operation of the mobile station 100 so far illustrated in Step S1 of the flowchart of FIG. 5 will be described in detail FIG. 9 is a flowchart illustrating the operation of a measurement result request 1 transmission process or the mobile station 100 according to the present embodiment. In the mobile station 100, when transmitting the measurement result request 1 under the control of the communication connection control unit 101 (Step S11), the baseband signal processing unit 105 measures the received quality of broadcast information 4 as downlink signals transmitted from the handover source base station 200b and the handover destination base station 200c (Step S12). When transmitting the measurement result request 1, the communication connection control unit 101 acquires the position information on the mobile station 100 from the position information acquisition unit 107 (Step S13).

Referring back to the flowchart of FIG. 5, when receiving the measurement result request 1c, the handover destination base station 200c performs a process on transmitting a measurement result 2c to the hand over source base station 200b (Step S2). Specifically, when the handover destination base station 200c receives the measurement result request 1c, the baseband signal processing unit 205 measures received quality at the time of receiving the measurement result request 1c, and the communication connection control unit 201 performs an operation on the basis of a message included in the measurement result request 1c. It is assumed that in the handover destination base station 200c, regarding the measurement of the received quality of the uplink signals, the baseband signal processing unit 205 not only measures received quality of a specific uplink signal such as the measurement result request 1c but also performs the measurement each time an uplink signal is received. In the handover destination base station 200c, the measurement information control unit 208 acquires the received quality information on the uplink signals measured in the baseband signal processing unit 205 and the time information on the time of measuring the received quality of the uplink signals by the baseband signal processing unit 205 via the data transmission/reception control unit 203, and stores the acquired information in the storage unit 209.

In the handover destination base station 200c which has received the measurement result request 1c, the communication connection control unit 201 confirms from the destination base station identification information 14 included in the measurement result request 1c that the measurement result request 1c is addressed to the base station 200c. The communication connection control unit 201 acquires the received quality information as the received quality of the measurement result request 1c measured when receiving the measurement result request 1c and the time information on the time of measuring the received quality of the measurement result request 1c stored in the storage unit 209 via the measurement information control unit 208, generates the measurement result 2c addressed to the handover source base station 200b indicated in the handover source base station identification information 15 included in the measurement result request 1c, and transmits the generated measurement result 2c to the handover source base station 200b. When the handover destination base station 200c transmits the measurement result 2c to the handover source base station 200b, the transmission can be performed, under the control of the communication connection control unit 201, via the wired data transmission/reception unit 202 and via the control station 300; via the data transmission/reception control unit 203, the baseband signal processing unit 205, and the wireless transmission/reception unit 206, and via the same wireless communication network as that for wireless communication with the mobile station 100; or via a wireless communication network different from that for the wireless communication with the mobile station 100.

As with the case of receiving the measurement result request 1c described above, when the handover destination base station 200c receives the measurement result request 1d from the mobile station 100, as illustrated in FIG. 7, a measurement result 2d is generated as a response to the measurement result request 1d and transmitted to the handover source base station 200b. When the handover destination base station 200c receives the measurement result request 1e from the mobile station 100, a measurement result 2e is generated as a response to the measurement result request 1e and transmitted to the handover source base station 200b. In the following description, the measurement results 2c to 2e can be referred to as a measurement result 2 when no distinction is made among them.

Figure 10:
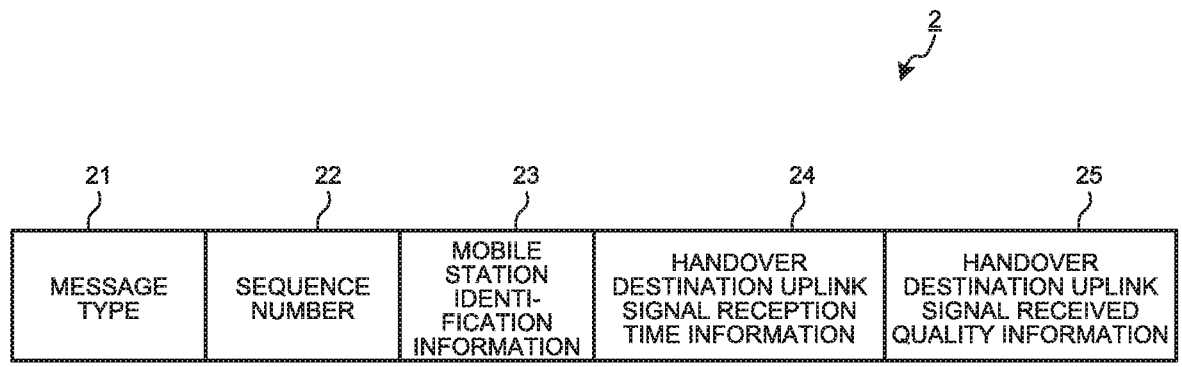
FIG. 10 is a diagram illustrating a configuration example of message information on a measurement result transmitted by the handover destination base station.

FIG. 10 is a diagram illustrating a configuration example of message information on the measurement result 2 transmitted by the handover destination base station 200c according to the present embodiment. The measurement result 2 includes message information on a message type 21, a sequence number 22, mobile station identification information 23, handover destination uplink signal reception time information 24, and handover destination uplink signal received quality information 25.

The message type 21 is information indicating that this is a message of the uplink signal received quality information as a response to the measurement result request transmitted by the handover destination base station 200c to the mobile station 100 via the handover source base station 200b. Upon receiving the measurement result 2, the handover source base station 200b transmits, to the mobile station 100 indicated by the mobile station identification information 23, the information on the handover destination uplink signal received quality information 25 included in the measurement result 2 together with the received quality information on the uplink signal measured by the handover source base station 200b at the time indicated by the handover destination uplink signal reception time information 24.

The sequence number 22 and the mobile station identification information 23 are the same as the sequence number 12 and the mobile station identification information 13 of the measurement result request 1 illustrated in FIG. 8, respectively.

The handover destination uplink signal reception time information 24 is information generated and provided by the handover destination base station 200c. It is the time information on the time of measuring the received quality of the measurement result request 1 acquired by the communication connection control unit 201 from the storage unit 209 via the measurement information control unit 208. As the handover destination uplink signal reception time information 24, any information can be employed as long as it is information which can specify the time when the uplink signal is received, and for example, a radio frame number included in the received uplink signal can be employed. The same applies to the time information acquired by the measurement information control unit 208 from the baseband signal processing unit 205 via the data transmission/reception control unit 203 and stored in the storage unit 209.

The handover destination uplink signal received quality information 25 is information generated and provided by the handover destination base station 200c. It is the measurement result of the received quality of the measurement result request 1 acquired by the communication connection control unit 201 from the storage unit 209 via the measurement information control unit 208.

Figure 11:
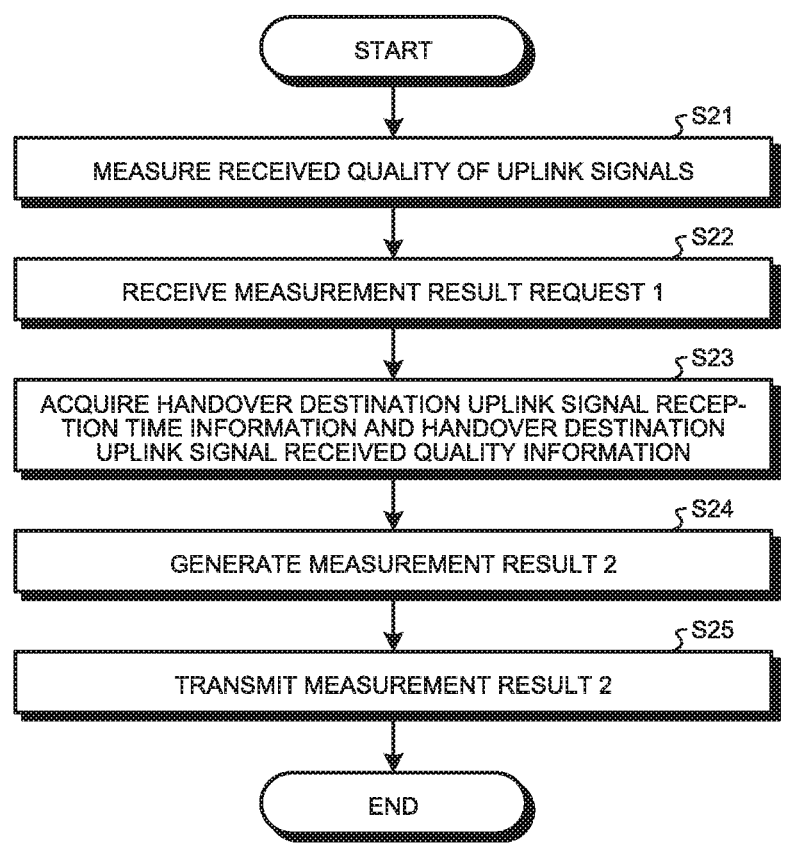
FIG. 11 is a flowchart illustrating an operation of a measurement result transmission process of the handover destination base station.

The operation of the handover destination base station 200c so far illustrated in Step S2 of the flowchart of FIG. 5 will be described in detail FIG. 11 is a flowchart illustrating the operation of a measurement result 2 transmission process of the handover destination base station 200c according to the present embodiment. In the handover destination base station 200c, the baseband signal processing unit 205 measures the received quality of the uplink signals transmitted from the mobile station 100 (Step S21). Upon receiving the measurement result request 1 from the mobile station 100 ((Step S22), the communication connection control unit 201 acquires the information on the handover destination uplink signal reception time information 24 and the handover destination uplink signal received quality information 25 from the storage unit 209 (Step S23), generates the measurement result 2 (Step S24), and transmits the measurement result 2 to the handover source base station 200b (Step S25).

Thus, in the handover destination base station 200c, the wireless communication unit 211 measures the received quality of the measurement result request 1 addressed to the base station 200c received from the mobile station 100. The measurement information management unit 212 acquires and stores the received quality information on the measurement result request 1 measured by the wireless communication unit 211 and the time information on the time of measuring the received quality of the measurement result request 1. The communication connection control unit 201 transmits, via the wireless communication unit 211, the measurement result 2 which includes the received quality information on the measurement result request 1 and the time information on the time of measuring the received quality of the measurement result request 1 to the handover source base station 200b to which the mobile station 100 is currently connected.

Referring back to the flowchart of FIG. 5, upon receiving the measurement result 2c, the handover source base station 200b performs a process on transmitting the measurement result 3c to the mobile station 100 (Step S3). Specifically, when the handover source base station 200b receives the measurement result 2c, the communication connection control unit 201 performs an operation on the basis of a message included in the measurement result 2c. It is assumed, similar to the handover destination base station 200c, that in the handover source base station 200b, regarding the measurement of the received quality of the uplink signals, the baseband signal processing unit 205 not only measures received quality of a specific uplink signal but also performs the measurement each time an uplink signal is received. In the handover source base station 200b, the measurement information control unit 208 acquires, via the data transmission/reception control unit 203, the received quality information on the uplink signals measured in the baseband signal processing unit 205 and the time information on the time of measuring the received quality of the uplink signals in the baseband signal processing unit 205, and stores the acquired information in the storage unit 209.

In the handover source base station 200b which has received the measurement result 2c, the communication connection control unit 201 confirms that the handover destination uplink signal reception time information 24 and the handover destination uplink signal received quality information 25 included in the measurement result 2c are those of the adjacent base station 200c, and that the base station 200b is a transit station of the measurement result 2c transmitted from the base station 200c to the mobile station 100, from the contents of the message type 21. The communication connection control unit 201 acquires the received quality information at the time indicated by the handover destination uplink signal reception time information 24 stored in the storage unit 209 via the measurement information control unit 208, generates the measurement result 3c addressed to the mobile station 100 indicated in the mobile station identification information 23 included in the measurement result 2c, and transmits the generated measurement result 3c to the mobile station 100. In the handover source base station 200b, under the control of the communication connection control unit 201, the measurement result 3c is transmitted to the mobile station 100 by wireless communication via the data transmission/reception control unit 203, the baseband signal processing unit 205, and the wireless transmission/reception unit 206.

As with the case of receiving the measurement result 2c described above, when the handover source base station 200b receives the measurement result 2d from the handover destination base station 200c, as illustrated in FIG. 7, a measurement result 3d is generated as a response to the measurement result 2d and transmitted to the mobile station 100. When the handover source base station 200b receives the measurement result 2e from the handover destination base station 200c, a measurement result 3e is generated as a response to the measurement result 2e and transmitted to the mobile station 100. In the following description, the measurement results 3c to 3e can be referred to as a measurement result 3 when no distinction is made among them.

Figure 12:
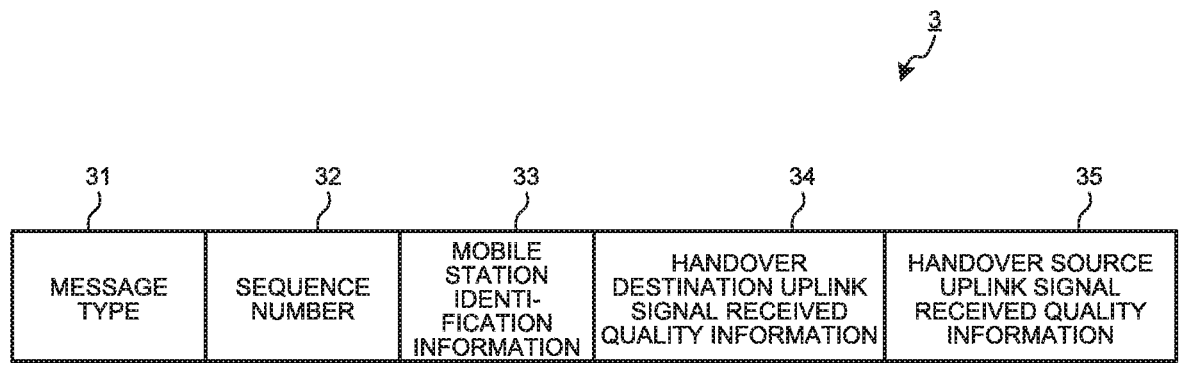
FIG. 12 is a diagram illustrating a configuration example of message information on a measurement result transmitted by the handover source base station.

FIG. 12 is a diagram illustrating a configuration example of message information on the measurement result 3 transmitted by the handover source base station 200b according to the present embodiment. The measurement result 3 includes message information on a message type 31, a sequence number 32, mobile station identification information 33, handover destination uplink signal received quality information 34, and handover source uplink signal received quality information 35.

The message type 31 is information indicating that it is a message of received quality information with respect to the measurement result request 1 transmitted by the mobile station 100.

The sequence number 32 and the mobile station identification information 33 are the same as the sequence number 12 and the mobile station identification information 13 of the measurement result request 1 illustrated in FIG. 8, as well as the sequence number 22 and the mobile station identification information 23 of the measurement result 2 illustrated in FIG. 10, respectively.

The handover destination uplink signal received quality information 34 is the same as the handover destination uplink signal received quality information 25 included in the measurement result 2.

The handover source uplink signal received quality information 35 is information generated and provided by the handover source base station 200b. It is the received quality information as the measurement result of the received quality of the uplink signal received at the time indicated by the handover destination uplink signal reception time information 24 of the measurement result 2 acquired by the communication connection control unit 201 from the storage unit 209 via the measurement information control unit 208.

In the handover source base station 200b, as described above, the baseband signal processing unit 205 measures the received quality each time an uplink signal is received, and the measurement information control unit 208 stores, in the storage unit 209, the received quality information on the uplink signals measured in the baseband signal processing unit 205 and the time information on the time of the measurement. When there is no received quality information on uplink signals measured at the same time as the time indicated by the handover destination uplink signal reception time information 24 in the storage unit 209, the communication connection control unit 201 acquires the received quality information measured at the time closest to the time indicated by the handover destination uplink signal reception time information 24 from the storage unit 209 via the measurement information control unit 208. When there is no received quality information measured within a predefined threshold period of time from the time indicated by the handover destination uplink signal reception time information 24, the communication connection control unit 201 does not provide a value, or provides an invalid value, to a column of the handover source uplink signal received quality information 35.

Figure 13:
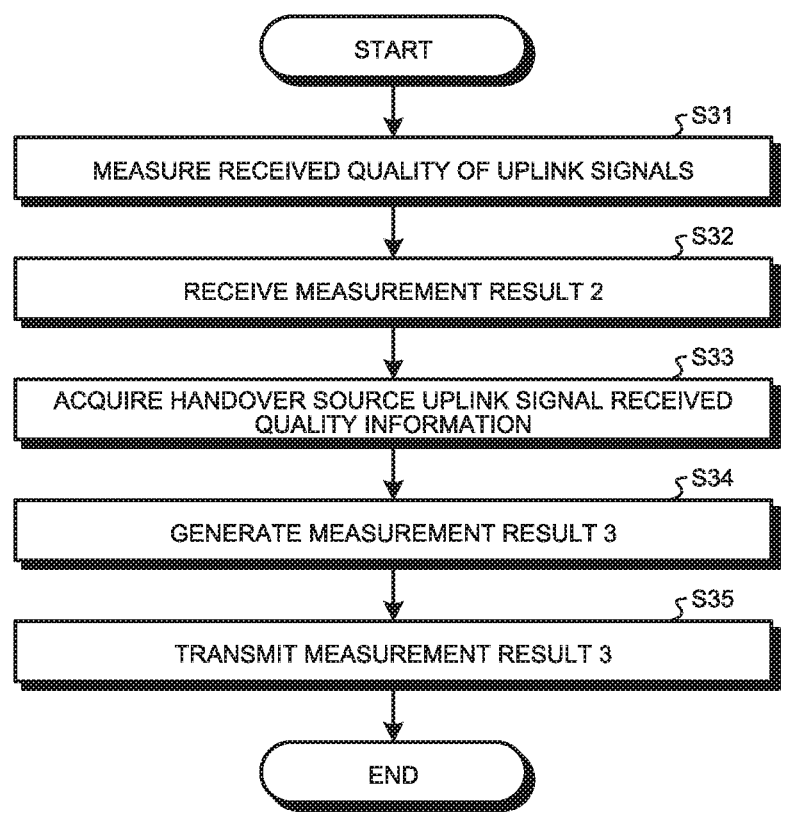
FIG. 13 is a flowchart illustrating an operation of a measurement result transmission process of the handover source base station.

The operation of the handover source base station 200b so far illustrated in Step S3 of the flowchart of FIG. 5 will be described in detail. FIG. 13 is a flowchart illustrating the operation of a measurement result 3 transmission process of the handover source base station 200b according to the present embodiment. In the handover source base station 200b, the baseband signal processing unit 205 measures the received quality of the uplink signals transmitted from the mobile station 100 (Step S31). Upon receiving the measurement result 2 from the handover destination base station 200c (Step S32), the communication connection control unit 201 acquires the information on the handover source uplink signal received quality information 35 from the storage unit 209 (Step S33), generates the measurement result 3 (Step S34), and transmits the measurement result 3 to the mobile station 100 (Step S35).

Thus, in the handover source base station 200b, the wireless communication unit 211 receives the measurement result 2 addressed to the base station 200b from the handover destination base station 200c. The communication connection control unit 201 acquires, from the measurement information management unit 212, the received quality information on the uplink signal at the time indicated by the time information on the time of measuring the received quality of the measurement result request 1 included in the measurement result 2, and transmits, to the mobile station 100 via the wireless communication unit 211, the measurement result 3 which includes the received quality information on the measurement result request 1 of the handover destination base station 200c included in the measurement result 2 and the received quality information on the uplink signal acquired from the measurement information management unit 212.

Referring back to the flowchart of FIG. 5, upon receiving the measurement result 3c, the mobile station 100 performs a process on storing together the information included in the measurement result 3c and the information already acquired in Step S1 as measurement information (Step S4). Specifically, upon receiving the measurement results 3c to 3e from the handover source base station 200b, the mobile station 100 stores the measurement results 3c to 3e in association with the position information on the mobile station 100 and received quality information on the downlink signals acquired at the time of transmitting the measurement result requests 1c to 1e corresponding to the measurement results 3c to 3e. In the mobile station 100, when receiving the measurement results 3c to 3e from the handover source base station 200b via the wireless transmission/reception unit 106, the baseband signal processing unit 105, and the data transmission/reception control unit 103, the communication connection control unit 101 confirms the message type 31, the sequence number 32, and the mobile station identification information 33 included in each of the measurement results 3c to 3e. The communication connection control unit 101 determines that the measurement result 3c is a response to the measurement result request 1c transmitted from the mobile station, that the measurement result 3d is a response to the measurement result request 1d transmitted from the mobile station, and that the measurement result 3e is a response to the measurement result request 1e transmitted from the mobile station. The communication connection control unit 101 outputs, to the measurement information control unit 108, information on the handover destination uplink signal received quality information 34 and the handover source uplink signal received quality information 35 included in the measurement results 3c to 3e together with the position information acquired at the time of transmitting the measurement result requests 1c to 1e respectively corresponding to the measurement results 3c to 3e.

As described above, the measurement information control unit 108 acquires, from the baseband signal processing unit 105 via the data transmission/reception control unit 103, the received quality information on the downlink signals for the handover source base station 200b and the handover destination base station 200c at the time of transmitting the measurement result requests 1c to 1e, and acquires, from the position information acquisition unit 107 via the communication connection control unit 101, the position information at the time of transmitting the measurement result requests 1c to 1e. The measurement information control unit 108 causes the storage unit 109 to store, as the received quality information on the same position information, the information on the handover destination uplink signal received quality information 34 and the handover source uplink signal received quality information 35 acquired from the communication connection control unit 101 and the received quality information on the downlink signals for the handover source base station 200b and the handover destination base station 200c at the time of transmitting the measurement result requests 1c to 1e measured by the mobile station, in association with the position information.

When acquiring the received quality information on the downlink signals at the time of transmitting the measurement result requests 1c to 1e from the baseband signal processing unit 105, the measurement information control unit 108 can further acquire information on the sequence number 12 included in the measurement result requests 1c to 1e. When acquiring the information on the handover destination uplink signal received quality information 34 and the handover source uplink signal received quality information 35 from the communication connection control unit 101, the measurement information control unit 108 can further acquire information on the sequence number 12 included in the measurement result requests 1c to 1e respectively corresponding to the measurement results 3c to 3e. In that case, the measurement information control unit 108 can associate the received quality information on the downlink signals at the time of transmitting the measurement result requests 1c to 1e and the information on the handover destination uplink signal received quality information 34 and the handover source uplink signal received quality information 35 with the sequence number.

FIG. 14 is a diagram illustrating an example of measurement information which the measurement information control unit 108 according to the present embodiment causes the storage unit 109 to store. The measurement information control unit 108 causes the storage unit 109 to store, as measurement information, information on a moving direction 41, reference position identification information 42, position information 43, handover destination uplink signal received quality information 44, handover source downlink signal received quality information 45, handover destination downlink signal received quality information 46, and handover source uplink signal received quality information 47.

The moving direction 41 is information which indicates the name of the line and the inbound or outbound line for the train, and is information given in advance as information on the train including the mobile station 100 mounted thereon, or information given from the control station 300 while the train is running and held in the mobile station 100 in the mobile station 100, the communication connection control unit 101 holds the information on the moving direction 41, the communication connection control unit 101 outputs the information on the moving direction 41 to the measurement information control unit 108, and the measurement information control unit 108 causes the storage unit 109 to store the information on the moving direction 41.

The reference position identification information 42 is information for identifying a base point of the position information 43 and is information handled as a part of the position information 43. It is assumed that the position information 43 includes a plurality of reference positions, and the reference positions are predetermined. The reference position identification information 42 and the position information 43 are information acquired by the position information acquisition unit 107.

The position information 43 indicates the distance between the mobile station 100 and the reference position, and indicates the position of the mobile station 100 at the timing when the mobile station 100 transmitted the measurement result requests 1c to 1e as illustrated in FIG. 7. Although the unit is assumed to be meter (m), it is merely an example, and the unit is not limited thereto.

The handover destination uplink signal received quality information 44 is received quality information on the uplink signals at the time of receiving the measurement result requests 1c to 1e transmitted by the mobile station 100, measured in the handover destination base station 200c. It corresponds to the handover destination uplink signal received quality information 34 illustrated in FIG. 12. Although the unit is assumed to be decibel (dB), it is merely an example, and the unit is not limited thereto. The same applies to the unit of each piece of received quality information thereafter.

The handover source downlink signal received quality information 45 is received quality information on the downlink signals transmitted from the handover source base station 200b measured in the baseband signal processing unit 105 of the mobile station 100.

The handover destination downlink signal received quality information 46 is received quality information on downlink signals transmitted from the handover destination base station 200c measured in the baseband signal processing unit 105 of the mobile station 100.

The handover source uplink signal received quality information 47 is received quality information on the uplink signals measured in the handover source base station 200b when the handover destination base station 200c received the measurement result requests 1c to 1e. It corresponds to the handover source link signal received quality information 35 illustrated in FIG. 12.

The measurement information stored in the storage unit 109 is obtained in the handover-available range 400 illustrated in each of FIGS. 6 and 7, and indicates the range of the handover-available range 400 with the reference position identification information 42 and the position information 43 illustrated in FIG. 14.

In the sequence diagram illustrated in FIG. 7, after receiving the measurement result 3e, the mobile station 100 cannot receive a broadcast information 4 transmitted from the handover source base station 200b, and detects out-of-synchronization with the handover source base station 200b. When the train including the mobile station 100 mounted thereon moves out of the range of the communication area 220b of the handover source base station 200b illustrated in FIG. 6, the mobile station 100 can no longer receive broadcast information 4 from the handover source base station 200b, and detects out-of-synchronization. In the mobile station 100, the communication connection control unit 101 executes connection to the handover destination base station 200c, and ends the measurement of the handover-available range 400 in the operation mode 1. In FIG. 6, the handover-available range 400 is an area where the communication area 220b of the handover source base station 200b and the communication area 220c of the handover destination base station. 200c overlap with each other, and in FIG. 7, the handover-available range 400 is a range in which the mobile station 100 can receive the measurement results 3c to 3e in response to the measurement result requests 1c to 1e transmitted to the handover destination base station 200c.

The operation of the mobile station 100 so far illustrated in Step S4 of the flowchart of FIG. 5 will be described in detail FIG. 15 is a flowchart illustrating a measurement information storage process of the mobile station 100 according to the present embodiment. In the mobile station 100, when receiving the measurement result 3 from the handover source base station 200b, the communication connection control unit 101 acquires the received quality information on the uplink signals of the handover destination base station 200c and the handover source base station 200b from the measurement result 3 (Step S41). The measurement information control unit 108 acquires the position information at the time of transmitting the measurement result request 1 together with the received quality information on the uplink signals from the communication connection control unit 101. The measurement information control unit 108 causes the storage unit 109 to store the received quality information on the uplink signals and the received quality information on the downlink signals already acquired from the baseband signal processing unit 105 in association with the position information (Step S42).

Thus, in the mobile station 100, the communication connection control unit 101 transmits the measurement result request 1 addressed to the handover destination base station 200c a plurality of times via the wireless communication unit 111 while being connected to the handover source base station 200b in the operation mode 1 for determining the handover position. When the communication connection control unit 101 acquires via the wireless communication unit 111, by the measurement result 3 which is a response to the measurement result request 1, the received quality information on the uplink signals measured in the handover destination base station 200c together with the received quality information on the uplink signals measured in the handover source base station 200b via the handover source base station 200b, the communication connection control unit 101 outputs, to the measurement information management unit 112, the acquired received quality information on the uplink signals of each base station together with the position information at the time of transmitting the measurement result request 1 acquired from the position information acquisition unit 107.

In addition, in the mobile station 100, the measurement information management unit 112 stores, for each measurement result request 1, the position information and the received quality information on the uplink signals of each base station 200 acquired from the communication connection control unit 101, and the received quality information on the downlink signals from each base station 200 measured at the time or transmitting the measurement result request 1 acquired from the wireless communication unit 111.

Next, the maintenance device 301 acquires the measurement information illustrated in FIG. 14 from the mobile station 100 (Step S5), and determines the handover position of the mobile station 100 by using the measurement information (Step S6). As described above, the maintenance device 301 acquires the measurement information illustrated in FIG. 14 from the mobile station 100 is wireless communication or the storage medium, and holds the measurement information in the measurement information holding unit 304. The measurement information held in the measurement information holding unit 304 is the same as the content of FIG. 14.

In the maintenance device 301, the handover position control unit 307 determines the handover position of the mobile station 100 by using the measurement information held in the measurement information holding unit 304. The method with which the handover position control unit 307 determines the handover position of the mobile station 100 will be described using a specific example.

Figure 16:
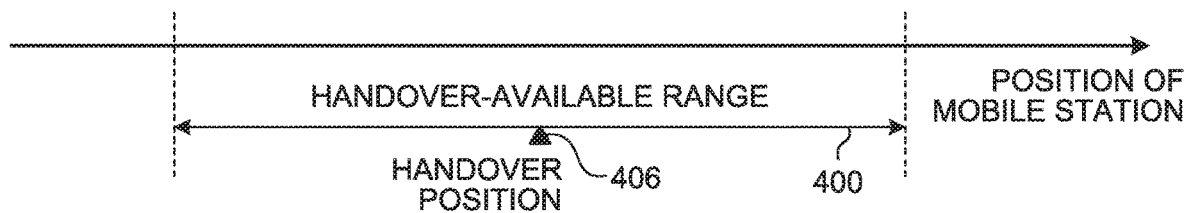
FIG. 16 is a diagram illustrating an example of determining a handover position from a central position of the handover-available range in a handover position control unit.

FIG. 16 is a diagram illustrating an example of determining a handover position 406 from the central position of the handover-available range 400 in the handover position control unit 307 according to the present embodiment. For example, the handover position control unit 307 can determine the handover position 406 through a simple calculation process by setting the central position of the handover-available range 400 as the handover position 406. It is assumed that the handover-available range 400 is the same as the handover-available range 400 illustrated in each of FIGS. 6 and 7, and that in FIG. 16, the handover source base station 200*b* is on the left side and the handover destination base station 200*c* is on the right side. The same applies to FIGS. 17 to 20 described later.

Here, when there is a variation in radio wave interference amounts in the vicinity of the base station 200 and the mobile station 100, the central position of the handover-available range 400 is not necessarily the best position for the handover position 406. The handover position control unit 307 can obtain the best handover position 406 with higher accuracy by considering the received quality of the signals in the base station 200 or the mobile station 100.

Figure 17:
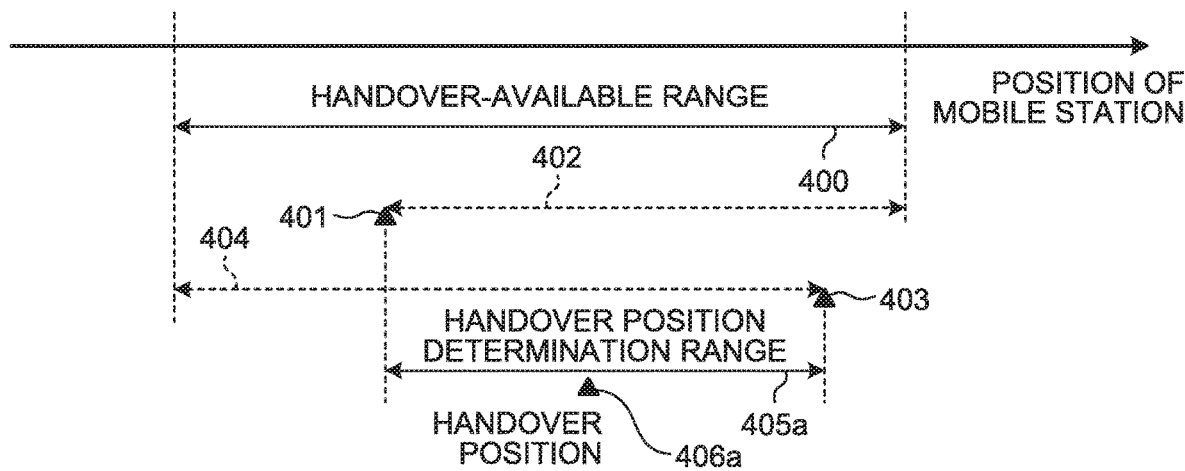
FIG. 17 is a diagram illustrating an example of determining a handover position in consideration of handover destination uplink signal received quality information and handover source downlink signal received quality information in the handover position control unit.

FIG. 17 is a diagram illustrating an example of determining a handover position 406*a* in consideration of the handover destination uplink signal received quality information 44 and the handover source downlink signal received quality information 45 in the handover position control unit 307 according to the present embodiment. In FIG. 17, a handover destination uplink signal received quality threshold 401 and a handover source downlink signal received quality threshold 403 are predefined received quality thresholds and are pieces of information held by the handover position control unit 307. In FIG. 17, the handover destination uplink signal received quality threshold 401 indicates a train's position where the received quality of the uplink signals from the mobile station 100 in the handover destination base station 200*c* becomes the handover destination uplink signal received quality threshold 401, and the handover source downlink signal received quality threshold 403 indicates a train's position where the received quality of the downlink signals from the handover source base station 200*b* in the mobile station 100 becomes the handover source downlink signal received quality threshold 403. The same applies to the rest of the document. The handover destination uplink signal received quality threshold 401 and the handover source downlink signal received quality threshold 403 are set in the handover position control unit 307 of the maintenance device 301 by, for example, an administrator of the mobile communication system 500.

Regarding the handover destination uplink signal received quality information 44 and the handover source downlink signal received quality information 45, the handover position control unit 307 determines the handover position within a range which satisfies the handover destination uplink signal received quality threshold 401 and the handover source downlink signal received quality threshold 403, that is, within a handover destination uplink signal received quality ensured range 402 which is a range within the handover-available range 400 achieving the handover destination uplink signal received quality threshold 401, and a handover source downlink signal received quality ensured range 404 which is a range within the handover-available range 400 achieving the handover source downlink signal received quality threshold 403. The handover destination uplink signal received quality ensured range 402 indicates a range in which the handover destination base station 200*c* can satisfactorily receive the uplink signals from the mobile station 100. The handover source downlink signal received quality ensured range 404 indicates a range in which the mobile station 100 can satisfactorily receive the downlink signals from the handover source base station 200*b*. In the example in FIG. 7, the measurement information illustrated in FIG. 14 obtained for the measurement result requests 1*c* to 1*e* is held in the measurement information holding unit 304. The handover position control unit 307 determines the handover position from the reference position identification information 42 and the position information 43, on the basis of the measurement information in which the handover destination uplink signal received quality information 44 achieves the handover destination uplink signal received quality threshold 401 and the handover source downlink signal received quality information 45 achieves the handover source downlink signal received quality threshold 403.

The has cover position control unit 307 sets a range where the handover destination uplink signal received quality ensured range 402 and the handover source downlink signal received quality ensured range 404 overlap with each other as a handover position determination range 405*a*. By determining the handover position from the handover position determination range 405*a*, the handover position control unit 307 can determine the handover position of the mobile station 100 within a range in which the handover destination base station 200*c* can satisfactorily receive the uplink signals and a range in which the mobile station 100 can satisfactorily receive the downlink signals from the handover source base station 200*b*. For example, the handover position control unit 307 sets the central position of the handover position determination range 405*a* as the handover position 406*a*.

However, in the communication area 220 of the base station 200, it is conceivable that the received quality falls to or below the handover destination uplink signal received quality threshold 401 or the handover source downlink signal received quality threshold 403 in a central portion rather than an end portion of the communication area 220 depending on surrounding environmental conditions or an installed antenna. The handover position control unit 307 determines the handover position from the measurement information held in the measurement information holding unit 304 while avoiding a position where the received quality has fallen to or below the handover destination uplink signal received quality threshold 401 or the handover source downlink signal received quality threshold 403.

Figure 18:
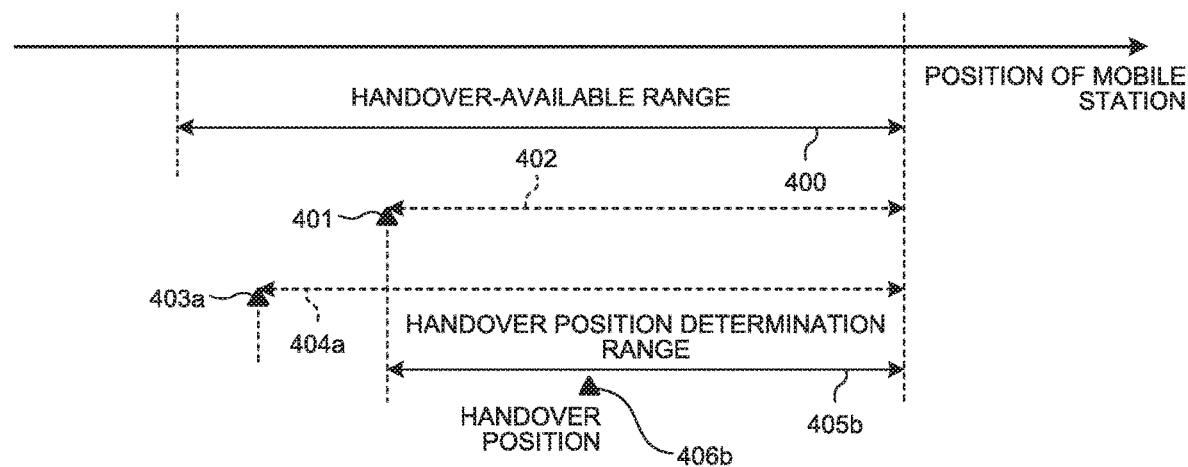
FIG. 18 is a diagram illustrating an example of determining a handover position in consideration of the handover destination uplink signal received quality information and the handover source downlink signal received quality information in the handover position control unit.

FIG. 18 is a diagram illustrating an example of determining a handover position 406*b* in consideration of the handover destination uplink signal received quality information 44 and the handover source downlink signal received quality information 45 in the handover position control unit 307 according to the present embodiment. A case different from that of FIG. 17 is assumed, and it is assumed that the handover source base station 200*b* has an antenna at a right end portion of the communication area 220*b*. When the antenna of the handover source base station 200*b* is located at the right end portion of the communication area 220 and has directivity in the center direction of the communication area 220*b*, the mobile station 100, after passing the side of the antenna of the handover source base station 200*b*, is out of the handover-available range 400. In such a case, a handover source downlink signal received quality ensured range 404*a* which achieves a handover source downlink signal received quality threshold 403*a* within the handover-available range 400 is a range as illustrated in FIG. 18. In FIG. 18, the handover source downlink signal received quality threshold 403a indicates train's position where the received quality of the downlink signals from the handover source base station 200b in the mobile station 100 becomes the handover source downlink signal received quality threshold 403a. The same applies co the rest of the document. Regarding the determination method for the handover position 406b, the handover position control unit 307 can determine the handover position 406b as the center of a handover position determination range 405b similar to the case of FIG. 17, or considering that the mobile station 100 moves and deviates from the handover-available range 400, the handover position control unit 307 can determine the handover position 406b as a position closer to the handover source base station 200b than the center of the handover position determination range 405b as illustrated in FIG. 18. It is assumed that the handover source downlink signal received quality threshold 403 in FIG. 17 and the handover source downlink signal received quality threshold 403a in FIG. 18 have different thresholds.

Figure 19:
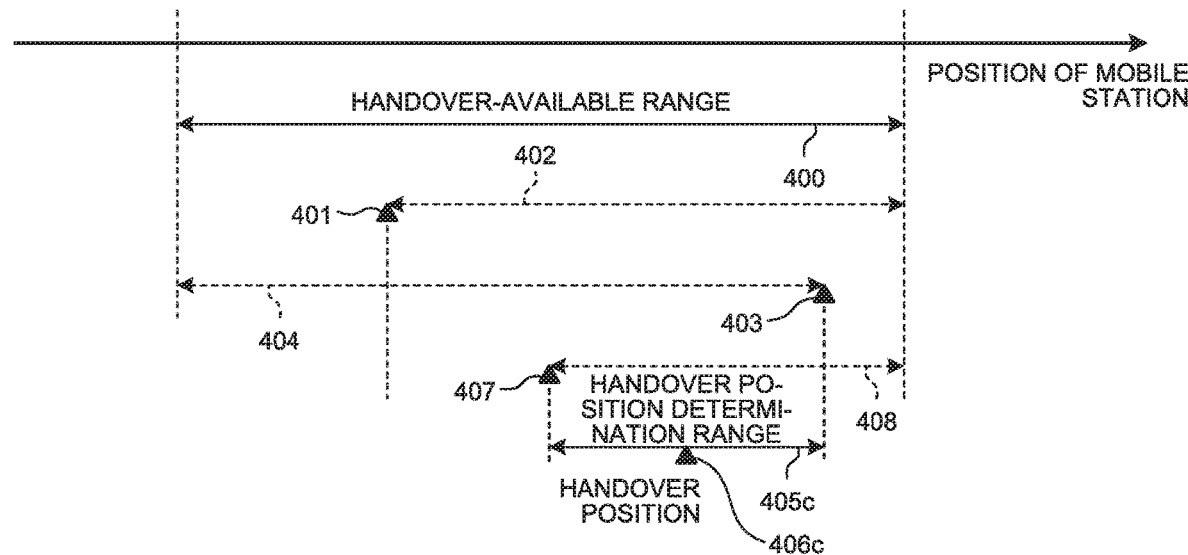
FIG. 19 is a diagram illustrating an example of determining handover position in consideration of the handover destination uplink signal received quality information, the handover source downlink signal received quality information, and handover destination downlink signal received quality information in the handover position control unit.

FIG. 19 is a diagram illustrating an example of determining a handover position 406c in consideration of the handover destination uplink signal received quality information 44, the handover source downlink signal received quality information 45, and the handover destination downlink signal received quality information 46 in the handover position control unit 307 according to the present embodiment. In FIG. 19, the handover destination uplink signal received quality threshold 401, the handover destination uplink signal received quality ensured range 402, the handover source downlink signal received quality threshold 403, and the handover source downlink signal received quality ensured range 404 are similar to those in FIG. 17. A handover destination downlink signal received quality threshold 407 is a predefined received quality threshold, and is information held by the handover position control unit 307. In FIG. 19, the handover destination downlink signal received quality threshold 407 indicates a train's position where the received quality of the downlink signals from the handover destination base station 200c in the mobile station 100 becomes the handover destination downlink signal received quality threshold 407. The same applies to the rest of the document. The handover destination downlink signal received quality threshold 407 is set in the handover position control unit 307 of the maintenance device 301 by, for example, an administrator or the like of the mobile communication system 500.

Regarding the handover destination uplink signal received quality information 44, the handover source downlink signal received quality information 45, and the handover destination downlink signal received quality information 46, the handover position control unit 307 determines the handover position 406c, within a range which satisfies the handover destination uplink signal received quality threshold 401, the handover source downlink signal received quality threshold 403, and the handover destination downlink signal received quality threshold 407, that is, within the handover destination uplink signal received quality ensured range 402, the handover source downlink signal received quality ensured range 404, and a handover destination downlink signal received quality ensured range 408 achieving the handover destination downlink signal received quality threshold 407 within the handover-available range 400. The handover destination downlink signal received quality ensured range 408 indicates a range in which the mobile station 100 can satisfactorily receive the downlink signals from the handover destination base station 200c.

The handover position control unit 307 sets a range where the handover destination uplink signal received quality ensured range 402, the handover source downlink signal received quality ensured range 404, and the handover destination downlink signal received quality ensured range 408 overlap with one another to be as a handover position determination range 405c. By determining the handover position 406c from the handover position determination range 405c, the handover position control unit 307 can determine the handover position 406c of the mobile station 100 within a range in which the handover destination base station 200c can satisfactorily receive the uplink signals, a range in which the mobile station 100 can satisfactorily receive the downlink signals from the handover source base station 200b, and a range in which the mobile station 100 can satisfactorily receive the downlink signals from the handover destination base station 200c. For example, the handover position control unit 307 sets the central position of the handover position determination range 405c as the handover position 406c. The method for determining, in the handover position control unit 307, the handover position while avoiding position where the received quality falls to or below any of the threshold is similar to that in the case illustrated in FIG. 18.

Figure 20:
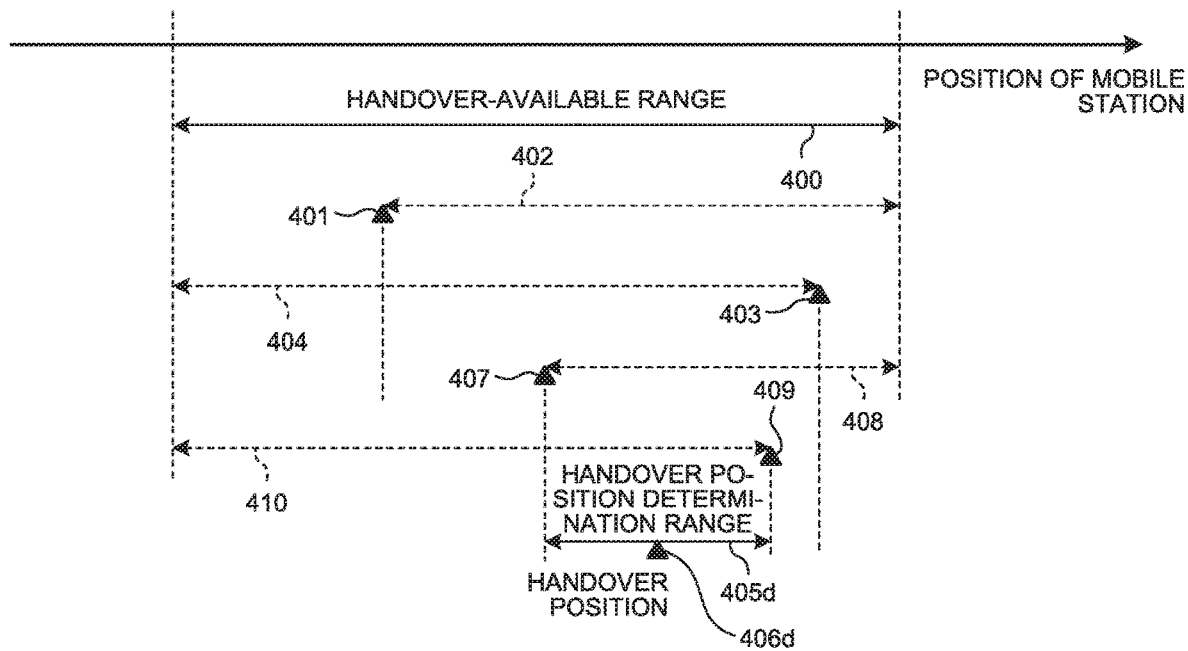
FIG. 20 is a diagram illustrating an example of determining a handover position in consideration of the handover destination uplink signal received quality information, the handover source downlink signal received quality information, the handover destination downlink signal received quality information, and handover source uplink signal received quality information in the handover position control unit.

FIG. 20 is a diagram illustrating an example of determining a handover position 406d in consideration of the handover destination uplink signal received quality information 44, the handover source downlink signal received quality information 45, the handover destination downlink signal received quality information 46, and the handover source uplink signal received quality information 47 in the handover position control unit 307 according to the present embodiment. In FIG. 20, the handover destination uplink signal received quality threshold 401, the handover destination uplink signal received quality ensured range 402, the handover source downlink signal received quality threshold 403, the handover source downlink signal received quality ensured range 404, the handover destination downlink signal received quality threshold 407, and the handover destination downlink signal received quality ensured range 408 are similar to those in FIG. 19. A handover source uplink signal received quality threshold 409 is a predefined received quality threshold, and is information held by the handover position control unit 307. In FIG. 20, the handover source uplink signal received quality threshold 409 indicates a train's position where the received quality of the uplink signals from a mobile station 100 in the handover source base station 200b becomes the handover source uplink signal received quality threshold 409. The handover source uplink signal received quality threshold 409 is set in the handover position control unit 307 of the maintenance device 301 by, for example, an administrator of the mobile communication system 500.

Regarding the handover destination uplink signal received quality information 44, the handover source downlink signal received quality information 45, the handover destination downlink signal received quality information 46, and the handover source uplink signal received quality information 47, the handover position control unit 307 determines the handover position 406d, within a range which satisfies the handover destination uplink signal received quality threshold 401, the handover source downlink signal received quality threshold 403, the handover destination downlink signal received quality threshold 407, and the handover source uplink signal received quality threshold 409, that is, within the handover destination uplink signal received quality ensured range 402, the handover source downlink signal received quality ensured range 404, the handover destination downlink signal received quality ensured range 408, and a handover source uplink signal received quality ensured range 410 achieving the handover source uplink signal received quality threshold 409 within the handover-available range 400. The handover source uplink signal received quality ensured range 410 indicates a range in which the handover source base station 200b can satisfactorily receive the uplink signals from the mobile station 100.

The handover position control unit 307 sets a range where the handover destination uplink signal received quality ensured range 402, the handover source downlink signal received quality ensured range 404, the handover destination downlink signal received quality ensured range 408, and the handover source uplink signal received quality ensured range 410 overlap with one another as a handover position determination range 405d. By determining the handover position 406d from the handover position determination range 405d, the handover position control unit 307 can determine the handover position 406d of the mobile station 100 within a range in which the handover destination base station 200c can satisfactorily receive the uplink signals, a range in which the mobile station 100 can satisfactorily receive the downlink signals from the handover source base station 200b, a range in which the mobile station 100 can satisfactorily receive the downlink signals from the handover destination base station 200c, and a range in which the handover source base station 200b can satisfactorily receive the uplink signals. For example, the handover position control unit 307 sets the central position of the handover position determination range 405d as the handover position 406d. The method for determining, in the handover position control unit 307, the handover position while avoiding a position where the received quality falls to or below any of the threshold is similar to that in the case illustrated in FIG. 18.

By the handover posit-on control unit 307 determining the handover position 406d as illustrated in FIG. 20, in the mobile station 100, it is possible to ensure the received quality of the uplink signals and the downlink signals between the mobile station 100 and the handover source base station 200b, as well as between the mobile station 100 and the handover destination base station 200c, and to ensure good communication quality before and after the handover at the handover position 406d.

Figure 21:
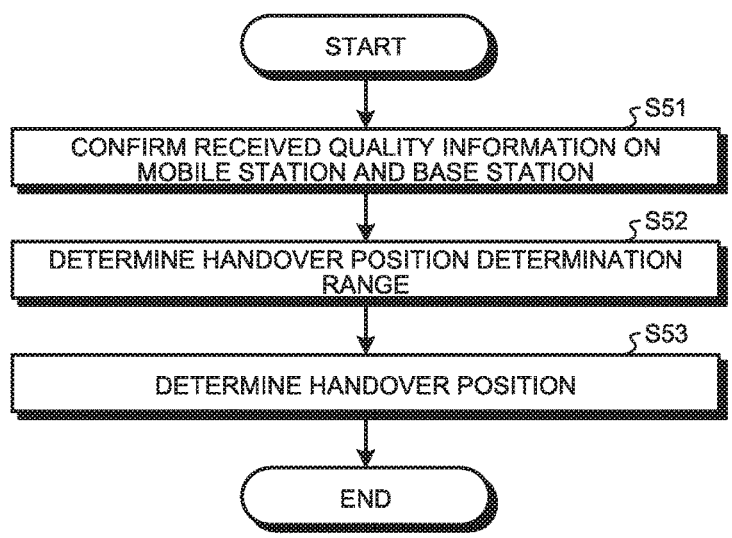
FIG. 21 is a flowchart illustrating a handover position determination process of the maintenance device.

The operation of the maintenance device 301 so far illustrated in Step S6 of the flowchart of FIG. 5 will be described in detail. FIG. 21 is a flowchart illustrating a handover position determination process of the maintenance device 301 according to the present embodiment. In the maintenance device 301, the handover position control unit 307 confirms the measurement information held in the measurement information holding unit 304, that is, the received quality information on the mobile station 100 and the base station 200 (Step S51). The handover position control unit 307 determines a handover position determination range 405 which can ensure good communication quality in the mobile station 100 and the base station 200 (Step S52) and determines the handover position 406 from the range of the handover position determination range 405 (Step S53).

Then, in the maintenance device 301, the handover position control unit 307 distributes information on the determined handover position to the mobile station 100 (Step S7).

The mobile stations 100 mounted on all trains traveling on the same line perform a handover at the same handover position. The method for distributing the information on the handover position from the maintenance device 301 has an opposite flow to the flow of the maintenance device 301 acquiring the received quality information from the mobile station 100. In the maintenance device 301, the handover position control unit 307 distributes the information on the handover position on-line to the mobile station 100 by wireless communication via the wired data transmission/reception unit 302, the control station 300, and the serving base station. Alternatively, in the maintenance device 301, the handover position control unit 307 outputs the information to the storage medium via the data input/output unit 310. That is, the data input/output unit 310 acquires the information on the handover position from the handover position control unit 307 and outputs the information to the storage medium The mobile station 100 acquires the information on the handover posit ion determined by the handover position control unit 307 from the data input/output unit 110 off-line via the storage medium.

In the above description, the maintenance device 301 determines the handover position of the mobile station 100 on the basis of the information measured once at each point by the mobile station 100 in the operation mode 1, but there is no limitation thereto. A plurality of measurements is performed at each point by the mobile station 100 traveling a plurality of times in the operation mode 1 or a plurality of mobile stations 100 performs the measurement in the operation mode 1, and thereby a plurality of data of received quality information can be collected in each line. The maintenance device 301 improves the accuracy of the received quality information on the signals of the mobile station 100 and the base station 200 at each point by performing a statistical process, for example, by collecting these data to take an average value thereof, and can determine the handover position by using the received quality information with the accuracy thus improved.

Next, a method for changing an already determined handover position in the mobile communication system 500 will be described. In the mobile communication system 500, it is conceivable that even if the maintenance device 301 determines a handover position in the operation mode 1 during the test running, a surrounding radio interference amount varies greatly depending on the actual running condition of the train or a period of time. Therefore, the mobile station 100 performs, in the operation mode 2, a received quality measurement similar to that in the operation mode 1 while the train is in operation, as well. When it is necessary to change a handover position, the maintenance device 301 changes the handover position by using the received quality information acquired through the measurement by the mobile station 100 in the operation mode 2. A flowchart illustrating operations of the mobile station 100, the base station 200, and the maintenance device 301 when the handover position is changed in the operation mode 2 is similar to that of FIG. 5. A difference from the case of the operation mode 1 will be described by using a detailed flowchart.

Figure 22:
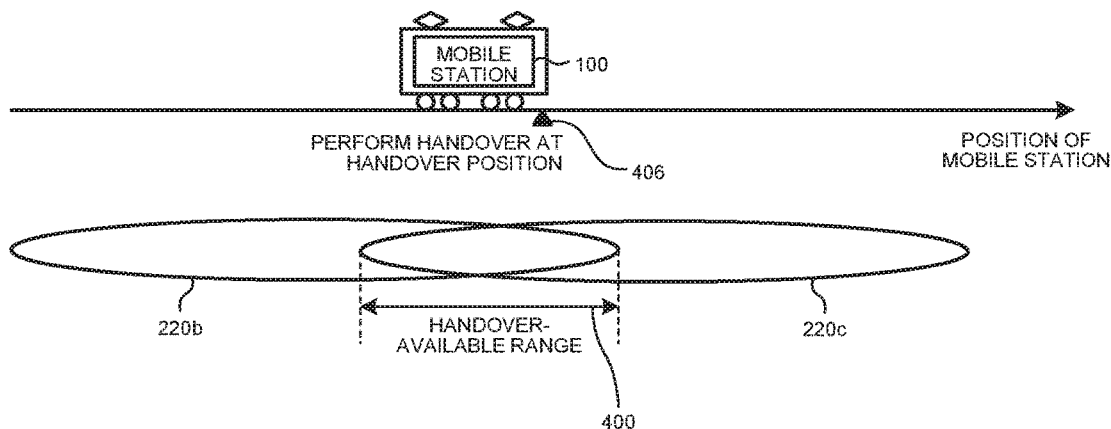
FIG. 22 is a diagram illustrating how the mobile station measures received quality at a current handover position in order to change the handover position.
Figure 23:
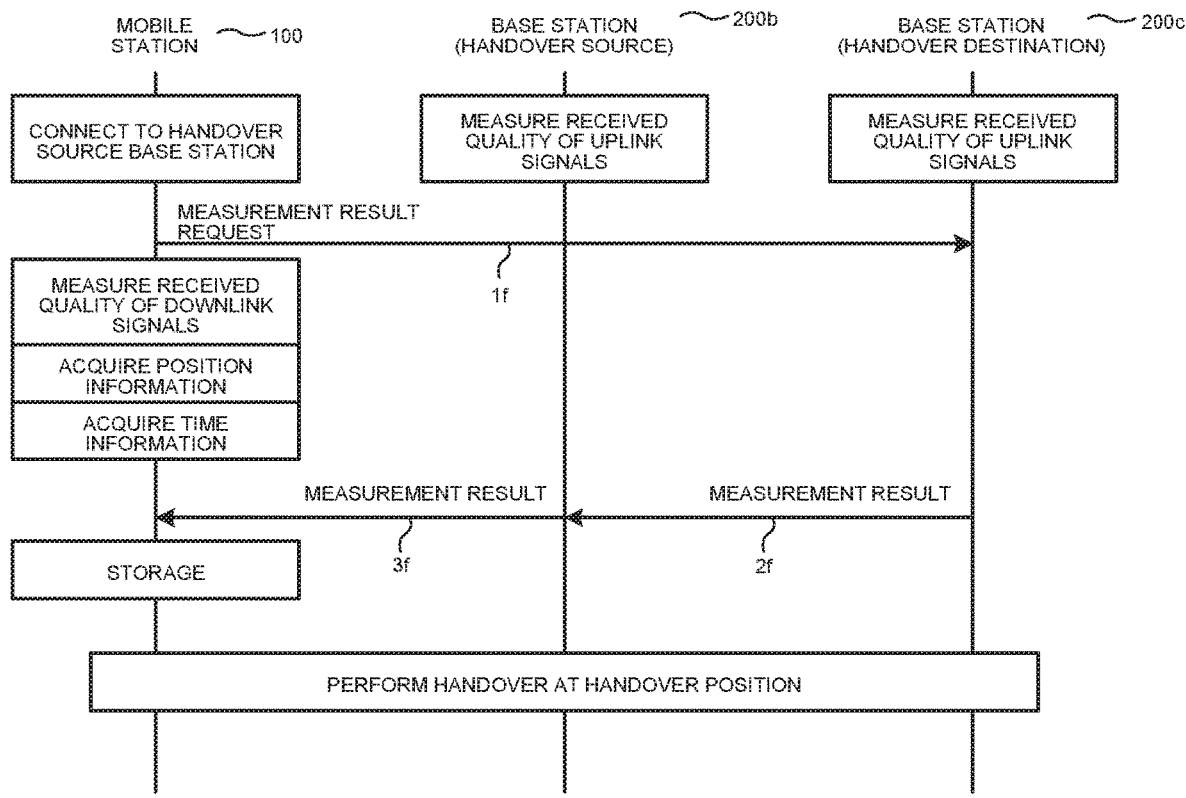
FIG. 23 is a sequence diagram illustrating operations of the mobile station, the handover source base station, and the handover destination base station in an operation mode 2.

FIG. 22 is a diagram illustrating how the mobile station 100 measures the received quality at the current handover position 406 in order to change the handover position 406 in the present embodiment. FIG. 23 is a sequence diagram illustrating operations of the mobile station 100, the handover source base station 200b and the handover destination base station 200c in the operation mode 2 in the present embodiment. In FIG. 22, the arrangement of the handover source base station 200b and the handover destination base station 200c, and the like are under the same condition as that illustrated in FIG. 6, but FIG. 22 illustrates case where the mobile station 100 is operating in the operation mode 2.

In the mobile station 100, under the control of the communication connection control unit 101, the measurement result request 1f similar to that in the operation mode 1 is transmitted to the handover destination base station 200c only once immediately before the handover position 406. At that time, an operation in which the mobile station 100 generates and transmits the measurement result request 1f, an operation in which the handover destination base station 200c generates and transmits a measurement result 2f, and an operation in which the handover source base station 200b generates and transmits a measurement result 3f are similar, for example, to the above-described operations in a case where the measurement result request 1c is transmitted from the mobile station 100 in the operation mode 1 illustrated in FIG. 7.

In the mobile station 100, when the measurement result request 1f is transmitted under the control of the communication connection control unit 101, the baseband signal processing unit 105 measures received quality of the downlink signals from the handover source base station 200b and the handover destination base station 200c. In the mobile station 100, in addition to the received quality of the downlink signals measured in the baseband signal processing unit 105, the measurement information control unit 108 acquires, via the data transmission/reception control unit 103, time information on the time of measuring the received quality of the downlink signals in the baseband signal processing unit 105 in the operation mode 2, and stores the acquired information in the storage unit 109.

Thus, in the operation mode 2, the measurement information control unit 108 causes the storage unit 109 to store, as measurement information, the moving direction 41, the reference position identification information 42, the position information 43, and each piece of the received quality information illustrated in FIG. 14, each obtained in one measurement, and in addition, the time information acquired from the baseband signal processing unit 105 via the data transmission/reception control unit 103. The position of the mobile station 100 indicated by the reference position identification information 42 and the position information 43 at that time is regarded as the handover position 406. That is, the storage unit 109 stores each piece of received quality information and time information at the handover position 406 in association with the position of the handover position 406. The operation in which the measurement information control unit 108 acquires the time information from the baseband signal processing unit 105 via the data transmission/reception control unit 103 in the mobile station 100 is similar to the operation in which the measurement information control unit 208 acquires the time information from the baseband signal processing unit 205 via the data transmission/reception control unit 203 in the base station 200 in the operation mode 1.

When the position of the mobile station 100 reaches the handover position 406 after receiving the measurement result 3f from the handover source base station 200b under the control of the communication connection control unit 101, the mobile station executes a handover to the handover destination base station 200c, and performs switching from a communication channel with the handover source base station 200b to the communication channel with the handover destination base station 200c.

Figure 24:
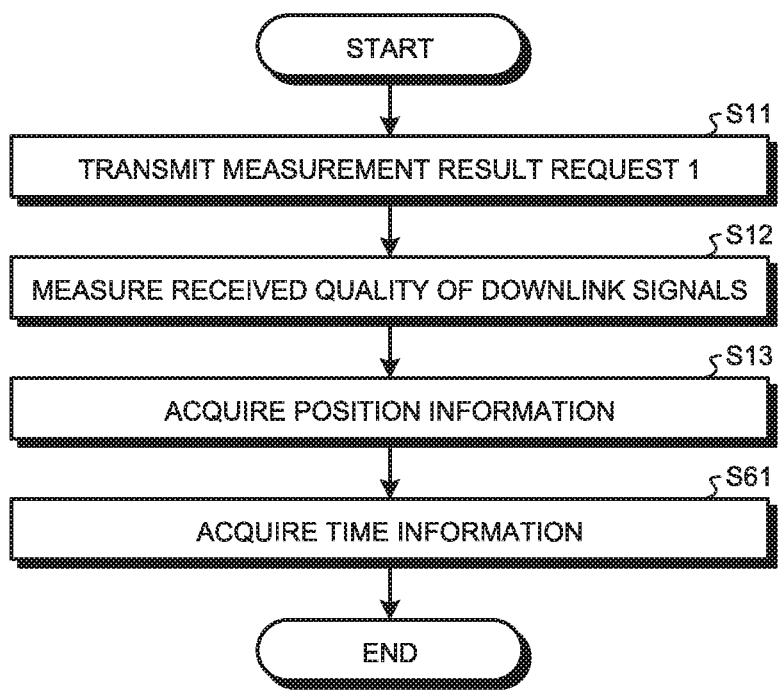
FIG. 24 is a flowchart illustrating an operation of a measurement result request transmission process of the mobile station in the operation mode 2.

In the operation mode 2, the operation of the mobile station 100 illustrated in Step S1 of the flowchart of FIG. 5 is as illustrated in FIG. 24. FIG. 24 is a flowchart illustrating the operation of a measurement result request 1f transmission process of the mobile station 100 in the operation mode 2 according to the present embodiment. The processes in Steps S11 to S13 are similar to those in Steps S11 to S13 illustrated in FIG. 9 in operation mode 1. The measurement information control unit 108 acquires time information on the time of measuring the received quality of the downlink signals in the baseband signal processing unit 105 from the baseband signal processing unit 105 (Step S61).

Figure 25:
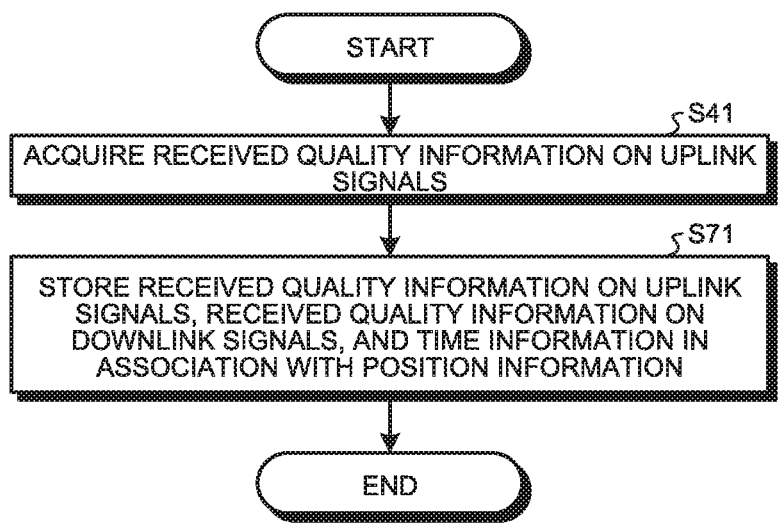
FIG. 25 is a flowchart illustrating a measurement information storage process of the mobile station in the operation mode 2.

In the operation mode 2, the operation of the mobile station 100 illustrated in Step S4 of the flowchart of FIG. 5 is as illustrated in FIG. 25. FIG. 25 is a flowchart illustrating a measurement information storage process of the mobile station 100 in the operation mode 2 according to the present embodiment. The process in Step S41 is similar to that in Step S41 illustrated in FIG. 15 in the operation mode 1. The measurement information control unit 108 acquires position information at the time of transmitting the measurement result request 1f together with received quality information on the uplink signals from the communication connection control unit 101. The measurement information control unit 108 causes the storage unit 109 to store the received quality information on the uplink signals, the received quality information on the downlink signals which has been acquired from the baseband signal processing unit 105, and the time information in association with the position information (Step S71).

Thus, in the mobile station 100, in the operation mode 2 for changing the handover position 406, the communication connection control unit 101 transmits the measurement result request 1f addressed to the handover destination base station 200c via the wireless communication unit 111 while being connected to the handover source base station 200b before performing a handover at the handover position 406, acquires via the wireless communication unit 111, by she measurement result 3f which is a response to the measurement result request 1f, the received quality information on the uplink signals measured in the handover destination base station 200c together with the received quality information on the uplink signals measured in the handover source base station 200b via the base station 200b, and outputs, to the measurement information management unit 112, the acquired received quality information on the uplink signals of each base station together with the position information at the time of transmitting the measurement result request 1f acquired from the position information acquisition unit 107.

In the mobile station 100, the measurement information management unit 112 stores the position information and the received quality information on the uplink signals of each base station acquired from the communication connection control unit 101 as well as the received quality information on the downlink signals from each base station 200 measured at the time of transmitting the measurement result request 1f and the time information on the time of measuring the received quality of the downlink signals acquired from the wireless communication unit 111.

The maintenance device 301 acquires the measurement information stored in the storage unit 109 of the mobile station 100 in the operation mode 2 by a similar method to that in the operation mode 1, that is, via wireless communication or off-line by using a storage medium.

In the maintenance device 301, the measurement information holding unit 304 holds measurement information measured in the operation mode 2 acquired from the plurality of mobile stations 100. Here, with the use of the operation information on the train provided by the train operation information management unit 305, the measurement information processing unit 306 performs control such that the handover position control unit 307 does not use a piece of measurement information affected by an operation of another train in the measurement of the received quality, among pieces of the measurement information held by the measurement information holding unit 304, when determining the handover position 406. The measurement information processing unit 306 selects a piece of the measurement information unusable by the handover position control unit 307 when determining the handover position 406.

The handover position control unit 307 uses, among pieces of the measurement information held by the measurement information holding unit 304, usable pieces of the measurement information obtained by excluding an unusable piece thereof through the process of the measurement information processing unit 306. The handover position control unit 307 determines whether it is necessary to change the handover position 406 by using, among the usable pieces of the measurement information, a piece of the information including the same position information, that is, a piece of the measurement information including the same combination of the handover source base station and the handover destination base station, and when it is necessary to change the handover position, the handover position control unit 307 determines a changed handover position by using the usable pieces of the information. The handover position control unit 307 determines whether the current handover position appropriate in accordance with threshold determination. When a specific piece of information among the pieces of measurement information on the handover position 406, for example, the handover destination uplink signal received quality information 44 falls below a predetermined threshold, the handover position control unit 307 changes the handover position 406 in a direction closer to the handover destination base station 200c. The thresholds used by the handover position control unit 307 in the operation mode 2 can be the same values as the thresholds 401, 403, 407, and 409 illustrated in FIG. 20, respectively, or can be different values therefrom, and are each set as an independent threshold.

In the handover position control unit 307, regarding an amount of change in the handover position 406, a change is made by an amount which can improve the difference from the predetermined threshold. In calculation of the change amount, the change amount is determined by referring to calculation of radio wave propagation loss and the measurement information in the operation mode 1. Even when a plurality of pieces of received quality information among pieces of the measurement information on the handover position 406 falls below a predetermined threshold, the handover position control unit 307 makes a change so as to improve the difference from each of the thresholds. The handover position control unit 307 uses the time information stored together with the measurement information when there is a large variation in the measurement results depending on periods of time, and when the change amount of the handover position 406 greatly differs depending on periods of time, the handover position control unit 307 can determine the handover position 406 for each of certain periods of time.

Figure 26:
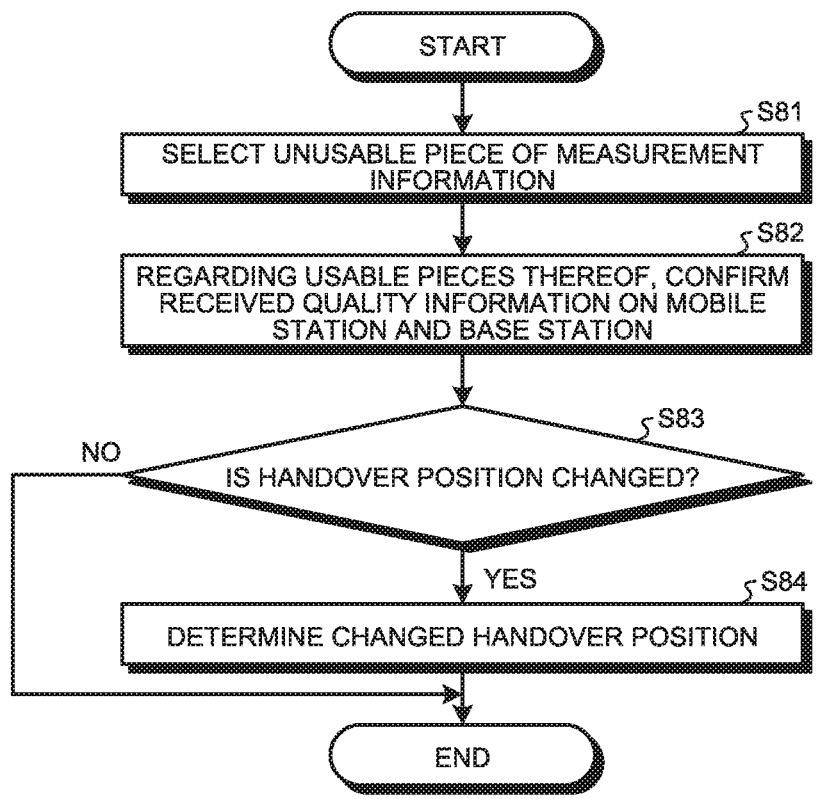
FIG. 26 is a flowchart illustrating a handover position determination process of the maintenance device in the operation mode 2.

In the operation mode 2, the operation of the maintenance device 301 illustrated in Step S6 of the flowchart of FIG. 5 is as illustrated in FIG. 26. FIG. 26 is a flowchart illustrating a handover position determination process of the maintenance device 301 in the operation mode 2 according to the present embodiment. In the maintenance device 301, the measurement information processing unit 306 selects a piece of the measurement information unusable by the handover position control unit 307 when determining the handover position 406 among pieces of the measurement information held by the measurement information holding unit 304 (Step S81). The handover position control unit 307 confirms the received quality information on the mobile station 100 and the base station 200 regarding usable pieces of the measurement information among the measurement information held in the measurement information holding unit 304 (Step S82). The handover position control unit 307 determines whether to change the handover position 406 on the basis of the received quality information on the mobile station 100 and the base station 200 (Step S83). When changing the handover position 406 (Step S83: Yes), the handover position control unit 307 determines a changed handover position 406 on the basis of the received quality information on the mobile station 100 and the base station 200 (Step S84). When not changing the handover position 406 (Step S83: No), the handover position control unit 307 ends the process. In the maintenance device 301, when the handover position control unit 307 determines that the handover position 406 is not changed (Step S83: No), the process in Step S7 illustrated in FIG. 5 is omitted. Although the case has been described where the maintenance device 301 changes the handover position 406 on the basis of the received quality information in the operation mode 2 from the mobile station 100 obtained in one measurement, this is merely an example. Determination whether to change the handover position 406, or determination of the changed handover position 406 can be performed by using the received quality information in the operation modes 2 from the mobile station 100 obtained in a plurality of measurements or the received quality information in the operation mode 2 from a plurality of mobile stations 100.

Figure 27:
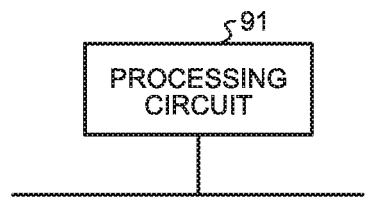
FIG. 27 is a diagram illustrating an example of a hardware configuration.
Figure 28:
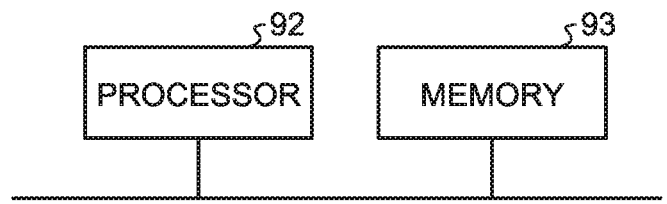
FIG. 28 is a diagram illustrating an example of the hardware configuration.

Here, a hardware configuration of the mobile station 100 will be described. FIGS. 27 and 28 are diagrams illustrating examples of the hardware configuration of the communication connection control unit 101, the position information acquisition unit 107, and the measurement information control unit 108 in the mobile station 100. As described above, in the mobile station 100, the wired data transmission/reception unit 102 is constituted by a transmitter and a receiver for wired communication. The wireless communication unit 111 is constituted by a transmitter and a receiver for wireless communication. The data input/output unit 110 is constituted by an input interface circuit and an output interface circuit. The storage unit 109 is constituted by a memory. The functions of the communication connection control unit 101, the position information acquisition unit 107, and the measurement information control unit 108 in the mobile station 100 are achieved by a processing circuit 91. That is, the mobile station 100 includes a processing device for controlling the transmission/reception of the measurement result request 1, acquiring the position information on the mobile station, and acquiring the received quality information on the mobile station 100 and the base station 200. The processing circuit 91 can be dedicated hardware, or a central processing unit (CPU), central processor, a processing unit, an arithmetic unit, a microprocessor, a microcomputer, a processor 92, or a digital signal processor (DSP), which executes a program stored in a memory 93.

When the processing circuit 91 is dedicated hardware, the processing circuit 91 corresponds to, for example, a single circuit, a composite circuit, a programmed processor, a parallel programmed processor, an Application Specific Integrated Circuit (ASIC), a Field Programmable Gate Array (FPGA), or a combination thereof. Regarding the communication connection control unit 101, the position information acquisition unit 107, and the measurement information control unit 108, the functions of respective units can be separately achieved by the processing circuit 91, or the functions of respective units can be collectively achieved by the processing circuit 91.

When the processing circuit 91 is a CPU, the functions of the communication connection control unit 101, the position information acquisition unit 107, and the measurement information control unit 108 are achieved by software, firmware, or a combination of software and firmware. The software or the firmware is described as a program and stored in a memory. The processing circuit 91 achieves the function of each unit by reading and executing a corresponding program stored in the memory. That is, the mobile station 100 includes the memory 93 for storing programs. When the programs are executed by the processing circuit 91, a step of controlling transmission and reception of the measurement result request 1, a step of acquiring the position information on the mobile station, and a step of acquiring the received quality information on the mobile station 100 and the base station 200 are executed as a result. It can also be said that these programs cause the computer to execute procedures or methods of the communication connection control unit 101, the position information acquisition unit 107, and the measurement information control unit 108. Here, the memory 93 corresponds to, for example, a non-volatile or volatile semiconductor memory such as a random access memory (RAM), a read only memory (ROM), a flash memory, an erasable programmable ROM (EPROM), or an electrically erasable programmable ROM (EEPROM), a magnetic disk, a flexible disk, an optical disk, a compact disc, a mini disk, or a digital versatile disc (DVD).

A part of the respective functions of the communication connection control unit 101, the position information acquisition unit 107, and the measurement information control unit 108 can be achieved by dedicated hardware and another part thereof can be achieved by software or firmware. For example, it is possible to achieve the function of the communication connection control unit 101 by a processing circuit as dedicated hardware, and to achieve the functions of the position information acquisition unit 107 and the measurement information control unit 108 by the processing circuit 91 reading and executing the programs stored in the memory.

Thus, the processing circuit 91 can achieve each of the above-described functions by hardware, software, firmware, or a combination thereof.

Although the description has been given for the mobile station 100, the communication connection control unit 201 and the measurement information control unit 208 of the base station 200, the train operation information management unit 305, the measurement information processing unit 306, and the handover position control unit 307 of the maintenance de ice 301 are also achieved by the example of the hardware configuration illustrated in FIGS. 27 and 28.

As described above, according to the present embodiment, in the operation mode 1, the mobile station 100 and the base station 200 measure the received quality of the received signals a plurality of times, and the maintenance device 301 determines the handover position of the mobile station 100 by using the received quality information on the received signals measured in the mobile station 100 and the base station 200. In the operation mode 2, the mobile station 100 and the base station 200 measure the received quality of the received signals, the maintenance device 301 determines whether it is necessary to change the handover position by using the received quality information on the received signals measured in the mobile station 100 and the base station 200, and when it is necessary to change the handover position, the handover position of the mobile station 100 is determined by using the received quality information on the received signals measured in the mobile station 100 and the base station 200. Consequently, in the mobile communication system 500, the handover position of the mobile station 100 can be determined and changed on the basis of the received quality of the signals transmitted and received between the mobile station 100 and the base station 200, which makes it possible to improve the stability and reliability for continuity of communication. In the maintenance device 301, by compiling a database of the measurement information obtained by repeating the measurement by a single mobile station 100 and the measurement information obtained through measurements performed by a plurality of mobile stations 100 in parallel, in the operation mode 1 and the operation mode 2, it is possible to determine the handover position with high accuracy in determining and changing the handover position.

The configuration described in the embodiment above indicates one example of the content of the present invention and can be combined with other known technology, and a part thereof can be omitted or modified without departing from the gist of the present invention.

REFERENCE SIGNS LIST

100 mobile station, 101 and 201 communication connection control unit, 102, 202, and 302 wired data transmission/reception unit, 103 and 203 data transmission/reception control unit, 104 and 204 radio resource management unit, 105 and 205 baseband signal processing unit, 106 and 206 wireless transmission/reception unit, 107 position information acquisition unit, 108 and 208 measurement information control unit, 109 and 209 storage unit, 110 and 310 data input/output unit, 111 and 211 wireless communication unit, 112 and 212 measurement information management unit, 200, 200a, 200b, 200c, and 200d base station, 300 control station, 301 maintenance device, 304 measurement information holding unit, 305 train operation information management unit, 306 measurement information processing unit, 307 handover position control unit, 500 mobile communication system.

The invention claimed is:
1. A mobile station comprising:
a wireless communication unit
to transmit and receive signals to and from a base station and
to measure received quality of downlink signals received from the base station;
a position information acquisition unit to acquire position information on the mobile station;
a measurement information management unit
to acquire
the position information,
received quality information that is measurement result of received quality of downlink signals received from a handover source base station currently connected and a handover destination base station to be connected next, with measuring being performed at the wireless communication unit, and received quality information that is measurement result of received quality of uplink signals from the mobile station measured at the handover destination base station and of measurement results of received quality of uplink signals acquired by the handover target base station from the handover source base station, and to store measurement information that is received quality information on signals transmitted and received between the mobile station and the base station; and a communication connection control unit to acquire the position information from the position information acquisition unit, to perform a handover when a position of the mobile station is a handover position determined on the basis of the measurement information, and to switch base stations to be connected.

2. The mobile station according to claim 1, wherein in an operation mode for determining the handover position, the communication connection control unit transmits a measurement result request addressed to the handover destination base station a plurality of times via the wireless communication unit while connected to the handover source base station, and when the communication connection control unit acquires via the wireless communication unit, as a response to the measurement result request, the received quality information on the uplink signals measured at the handover destination base station and also acquires via the handover source base station the received quality information on the uplink signals measured at the handover source base station, the communication connection control unit outputs, to the measurement information management unit, the acquired received quality information on the uplink signals of each base station together with the position information at the time of transmitting the measurement result request acquired from the position information acquisition unit, and the measurement information management unit stores, for each measurement result request, the position information and the received quality information on the uplink signals of each base station acquired from the communication connection control unit, and the received quality information on the downlink signals from each base station measured at the time of transmitting the measurement result request acquired from the wireless communication unit.

3. The mobile station according to claim 1, wherein in an operation mode for changing the handover position, the communication connection control unit transmits a measurement result request addressed to the handover destination base station via the wireless communication unit while connected to the handover source base station before performing a handover at the handover position, acquires via the wireless communication unit, as a response to the measurement result request, the received quality information on the uplink signals measured at the handover destination base station and also acquires, via the handover source base station, the received quality information on the uplink signals measured at the handover source base station, and outputs, to the measurement information management unit, the acquired received quality information on the uplink signals of each base station together with the position information at the time of transmitting the measurement result request acquired from the position information acquisition unit, and the measurement information management unit stores the position information and the received quality information on the uplink signals of each base station acquired from the communication connection control unit as well as the received quality information on the downlink signals from each base station measured at the time of transmitting the measurement result request and the time information on the time of measuring the received quality of the downlink signals acquired from the wireless communication unit.

4. The mobile station according to claim 1, wherein the communication connection control unit transmits, via the wireless communication unit, the measurement information to a maintenance device that determines the handover position on the basis of the measurement information or outputs the measurement information, via a data input/output unit that performs input and output of data with a storage medium, to the storage medium.

5. A system comprising:

a mobile station comprising:

a wireless communication unit to transmit and receive signals to and from a base station and to measure received quality of downlink signals received from the base station;

a position information acquisition unit to acquire position information on the mobile station;

a measurement information management unit to acquire the position information, received quality information that is measurement result of received quality of downlink signals received from a handover source base station currently connected and a handover destination base station to be connected next, with measuring being performed at the wireless communication unit, and received quality information that is measurement result of received quality of uplink signals from the mobile station measured at the handover destination base station and of measurement results of received quality of uplink signals acquired by the handover target base station from the handover source base station, and to store measurement information that is received quality information on signals transmitted and received between the mobile station and the base station; and a communication connection control unit to acquire the position information from the position information acquisition unit, to perform a handover when a position of the mobile station is a handover position determined on the basis of the measurement information, and to switch base stations to be connected;

a maintenance device that monitors a state of the mobile station, the maintenance device comprising:

a measurement information holding unit to hold the measurement information acquired from the mobile station; and a handover position control unit to determine a handover position of the mobile station on the basis of the measurement information.

6. The system according to claim 5, wherein
the handover position control unit determines the handover position such that received quality of uplink signals in the handover destination base station achieves received quality equal to or more than a handover destination uplink signal received quality threshold.

7. The system according to claim 5, wherein
the handover position control unit determines the handover position such that received quality of downlink signals in the handover source base station achieves received quality equal to or more than a handover source downlink signal received quality threshold.

8. The system according to claim 5, wherein
the handover position control unit determines the handover position such that received quality of downlink signals in the handover destination base station achieves received quality equal to or more than a handover destination downlink signal received quality threshold.

9. The system according to claim 5, wherein
the handover position control unit determines the handover position such that received quality of uplink signals in the handover source base station achieves received quality equal to or more than a handover source uplink signal received quality threshold.

10. The system according to claim 5, comprising:
a measurement information processing unit to select, on the basis of operation information on a train in a case where the mobile station is mounted on the train, a piece of measurement information unusable by the handover position control unit for determining the handover position among pieces of the measurement information held by the measurement information holding unit, wherein
the handover position control unit determines the handover position by using usable pieces of measurement information obtained by excluding an unusable piece thereof through a process performed by a measurement information processing unit.

11. The system according to claim 5, wherein
the handover position control unit
distributes information on a determined handover position to the mobile station by wireless communication via a base station or
outputs the information on the determined handover position, via a data input/output unit that performs input and output of data to and from a storage medium, to the storage medium.

12. A mobile communication system comprising:
a mobile station comprising:
a wireless communication unit
to transmit and receive signals to and from a base station and
to measure received quality of downlink signals received from the base station;
a position information acquisition unit to acquire position information on the mobile station;
a measurement information management unit
to acquire
the position information,
received quality information that is measurement result of received quality of downlink signals received from a handover source base station currently connected and a handover destination base station to be connected next, with measuring being performed at the wireless communication unit, and
received quality information that is measurement result of received quality of uplink signals from the mobile station measured at the handover destination base station and of measurement results of received quality of uplink signals acquired by the handover target base station from the handover source base station, and
to store measurement information that is received quality information on signals transmitted and received between the mobile station and the base station; and
a communication connection control unit
to acquire the position information from the position information acquisition unit,
to perform a handover when a position of the mobile station is a handover position determined on the basis of the measurement information, and
to switch base stations to be connected;
a base station to be connected to the mobile station that comprises:
a wireless communication unit
to transmit and receive signals to and from the mobile station and
to measure received quality of uplink signals received from the mobile station;
a measurement information management unit to acquire and store
received quality information on the uplink signals measured at the wireless communication unit and
time information on time of measuring the received quality of the uplink signals; and
a communication connection control unit to perform control such that the received quality information on the uplink signals is transferred; and
a maintenance device monitors a state of the mobile station, the maintenance device comprising:
a measurement information holding unit to hold the measurement information acquired from the mobile station; and
a handover position control unit that determines a handover position of the mobile station on the basis of received quality of signals transmitted and received between the mobile station and the base station.

13. A handover position determination method for a mobile communication system comprising a mobile station to measure received quality of downlink signals received from a base station, the base station to measure received quality of uplink signals received from the mobile station, and a maintenance device to monitor states of the mobile station and the base station, the handover position determination method comprising:
a measurement result request step performed by the mobile station of transmitting a measurement result request to a handover destination base station to be connected next, the mobile station being currently connected to a handover source base station;
a handover destination base station transmission step performed by the handover destination base station of, when the handover destination base station receives the measurement result request, transmitting to the handover source base station, a first measurement result that includes received quality information on the measurement result request and time information on time of measuring received quality of the measurement result request;

a handover source base station transmission step performed by the handover source base station of transmitting, to the mobile station, a second measurement result that includes received quality information on an uplink signal at the handover source base station at a time indicated by the time information on the first measurement result and the received quality information on the measurement result request of the handover destination base station included in the first measurement result;

a measurement information storage step performed by the mobile station of acquiring position information at a time of transmitting the measurement result request, received quality information that is measurement result of received quality of downlink signals received from the handover source base station and the handover destination base station, and from the handover source base station, received quality information on uplink signals measured at the handover destination base station and the handover source base station, and storing measurement information that is received quality information on signals transmitted and received between the mobile station and the base station; and a handover position determination step performed by the maintenance device of determining a handover position of the mobile station on the basis of the measurement information acquired from the mobile station.

* * * * *